United States Patent
Tawara

(10) Patent No.: US 9,973,888 B2
(45) Date of Patent: May 15, 2018

(54) RELAYING DEVICE, VOICE COMMUNICATION SYSTEM, AND VOICE COMMUNICATION METHOD

(71) Applicant: ICOM INCORPORATED, Osaka (JP)

(72) Inventor: Kenji Tawara, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days. days.

(21) Appl. No.: 15/123,873

(22) PCT Filed: Dec. 25, 2014

(86) PCT No.: PCT/JP2014/084334
§ 371 (c)(1),
(2) Date: Sep. 6, 2016

(87) PCT Pub. No.: WO2015/133044
PCT Pub. Date: Sep. 11, 2015

(65) Prior Publication Data
US 2017/0019758 A1   Jan. 19, 2017

(30) Foreign Application Priority Data
Mar. 7, 2014   (JP) ................................. 2014-045458

(51) Int. Cl.
*H04W 4/02* (2009.01)
*H04B 7/155* (2006.01)
(Continued)

(52) U.S. Cl.
CPC .......... *H04W 4/02* (2013.01); *H04B 7/15507* (2013.01); *H04L 65/4061* (2013.01);
(Continued)

(58) Field of Classification Search
CPC ....... H04W 4/02; H04W 4/10; H04W 64/003; H04W 4/023; H04W 84/12; H04B 7/15507
See application file for complete search history.

(56) References Cited

U.S. PATENT DOCUMENTS 7,292,575 B2 * 11/2007 Lemieux ................. H04L 45/04
370/392
7,688,801 B2 * 3/2010 Dougherty .......... H04L 12/4608
370/310.2
(Continued)

FOREIGN PATENT DOCUMENTS

JP      2010-109506 A      5/2010
WO      WO 2013003751 A1 *  1/2013   ........... H04L 67/025

OTHER PUBLICATIONS

International Search Report of PCT/JP2014/084334.
Supplementary European Search Report of the corresponding European application No. 14884879 dated Sep. 27, 2017.

*Primary Examiner* — Mehmood B. Khan
(74) *Attorney, Agent, or Firm* — Muncy, Geissler, Olds & Lowe, P.C.

(57) ABSTRACT

[Problem] To provide a voice communication system which causes a relaying device to manage communication between terminal devices based on the affiliations of the terminal devices, and manage the current positions of the respective terminal devices.
[Solution] In a voice communication system, a relaying device relays voice communication of a plurality of section systems. The relaying device stores, with respect to each of the section systems, a plurality of pieces of area information divided on the basis of the communication range of a wireless access point. A terminal device transmits a voice signal to which the identification code thereof is added. When receiving the voice signal from the terminal device,
(Continued)

| Destination IP Address | Transmission Source IP Address | Data Body | | | | | |
|---|---|---|---|---|---|---|---|
| | | Voice Signal | Communication-partner Identification Number(Session Number) | Section System Number | Neighborhood Communication Flag | Area Information (AP No) (BSSID) | Transmission Source Terminal Number | the relaying device identifies a section system to which this terminal device belongs from the identification code added to the voice signal, and identifies an area in which the terminal device is present on the basis of positional information relating to the terminal device. The relaying device transfers the voice signal to another terminal device which belongs to the identified section system and is present in the identified area.

4 Claims, 12 Drawing Sheets

(51) Int. Cl.
   *H04W 64/00* (2009.01)
   *H04L 29/06* (2006.01)
   *H04W 4/04* (2009.01)
   *H04W 4/08* (2009.01)
   *H04W 4/10* (2009.01)
   *H04W 84/12* (2009.01)

(52) U.S. Cl.
   CPC .......... *H04W 4/021* (2013.01); *H04W 4/043* (2013.01); *H04W 4/08* (2013.01); *H04W 64/003* (2013.01); *H04W 4/023* (2013.01); *H04W 4/10* (2013.01); *H04W 84/12* (2013.01)

(56) References Cited

U.S. PATENT DOCUMENTS

| | | | |
|---|---|---|---|
| 7,756,022 B1* | 7/2010 | Cook | H04L 45/04 370/216 |
| 8,176,532 B1* | 5/2012 | Cook | H04L 63/10 726/11 |
| 8,369,291 B2* | 2/2013 | Liebsch | H04W 52/0216 370/311 |
| 8,462,737 B1* | 6/2013 | Gage | H04B 7/0413 370/334 |
| 2002/0035699 A1* | 3/2002 | Crosbie | H04L 63/10 726/12 |
| 2004/0137907 A1* | 7/2004 | Kim | H04W 72/0446 455/450 |
| 2005/0036460 A1* | 2/2005 | Dougherty | H04L 12/4608 370/328 |
| 2006/0274716 A1* | 12/2006 | Oswal | H04L 45/50 370/349 |
| 2008/0037536 A1* | 2/2008 | Padmanabhan | H04L 45/04 370/389 |
| 2008/0159310 A1* | 7/2008 | Senga | H04W 36/0038 370/401 |
| 2010/0039992 A1* | 2/2010 | Prakash | H04W 8/005 370/328 |
| 2011/0032870 A1* | 2/2011 | Kumar | H04W 12/12 370/328 |
| 2011/0274037 A1* | 11/2011 | Jain | H04W 8/085 370/328 |
| 2012/0294199 A1 | 11/2012 | Anchan | |
| 2013/0072222 A1 | 3/2013 | Weill et al. | |
| 2015/0049749 A1* | 2/2015 | Kall | H04L 63/126 370/338 |
| 2017/0026335 A1* | 1/2017 | Dhulipala | H04L 61/2015 |

* cited by examiner

| Destination IP Address | Transmission Source IP Address | Data Body ||||||
|---|---|---|---|---|---|---|---|
| | | Voice Signal | Communication-partner Identification Number(Session Number) | Section System Number | Neighborhood Communication Flag | Area Information (AP No) (BSSID) | Transmission Source Terminal Number |

Terminal Table 301

| TRX Number | Section System Number | Terminal Number | IP Address | Active Flag | Setting Data Storage Address | Connected AP Number (BSSID) |
|---|---|---|---|---|---|---|
| 0 | − | 0 | 192.168.0.100 | ○ | − | − |
| 1 | 101 | 1 | 192.168.0.101 | ○ | 001 | 00-90-C7-XX-XX-01 |
| 2 | 102 | 1 | 192.168.0.102 | ○ | 002 | 00-90-C7-XX-XX-04 |
| 3 | 101 | 2 | 192.168.0.103 | ○ | 003 | 00-90-C7-XX-XX-01 |
| 4 | 102 | 2 | 192.168.0.104 | ○ | 004 | 00-90-C7-XX-XX-04 |
| ⋮ | ⋮ | ⋮ | ⋮ | ⋮ | ⋮ | ⋮ |
| 199 | 101 | 100 | 192.168.0.XXX | ○ | 199 | 00-90-C7-XX-XX-YY |
| 200 | 102 | 100 | 192.168.0.XXX | × | 200 | 00-90-C7-XX-XX-YY |

Fig. 7A

Area Table 304A

| Area Number | AP Number (BSSID) |
|---|---|
| 1 | 00-90-C7-XX-XX-01<br>00-90-C7-XX-XX-02 |
| 2 | 00-90-C7-XX-XX-03 |
| ⋮ | ⋮ |
| 5 | 00-90-C7-XX-XX-YY |

Area Table 304B

| Area Number | AP Number (BSSID) |
|---|---|
| 1 | 00-90-C7-XX-XX-04<br>00-90-C7-XX-XX-05 |
| 2 | 00-90-C7-XX-XX-09 |
| ⋮ | ⋮ |
| 5 | 00-90-C7-XX-XX-YY |

Fig. 7B

Group Table 302A

| Group Number | Belonging Terminal |
|---|---|
| G1 | 1,2,3,4,5 |
| G2 | 6,7,8,9,10 |
| ⋮ | ⋮ |
| G20 | 96,97,98,99,100 |

Group Table 302B

| Group Number | Belonging Terminal |
|---|---|
| G1 | 1,2,3,4,5 |
| G2 | 6,7,8,9,10 |
| ⋮ | ⋮ |
| G20 | 96,97,98,99,100 |

Fig. 7C

Mixing Table 303A

| Session Number | Calling Terminal | Additional Terminal | Excluded Terminal | Participating Terminal | Holding Time (TS) |
|---|---|---|---|---|---|
| G1 | 23 | 23 | 2 | 1,3,4,5,23 | 250 |
| 19 | 2 | – | – | 2,19 | 250 |

Mixing Table 303B

| Session Number | Calling Terminal | Additional Terminal | Excluded Terminal | Participating Terminal | Holding Time (TS) |
|---|---|---|---|---|---|
| A | 23 | – | 100 | 1,⋯,99 | 250 |

Fig. 8A

Mixing Table 303A

| Session Number | Calling Terminal | Additional Terminal | Excluded Terminal | Participating Terminal | Holding Time (TS) |
|---|---|---|---|---|---|
| G1 | 3 | – | 4,5 | 1,2,3 | 250 |

Mixing Table 303B

| Session Number | Calling Terminal | Additional Terminal | Excluded Terminal | Participating Terminal | Holding Time (TS) |
|---|---|---|---|---|---|
| A | 98 | – | – | 98,99 | 250 |

Fig. 8B

Mixing Table 303A

| Session Number | Calling Terminal | Additional Terminal | Excluded Terminal | Participating Terminal | Holding Time (TS) |
|---|---|---|---|---|---|
| G2 | 0 | – | 6,7 | 0,8,9,10 | 250 |

Fig. 8C

Belonging Area Table /600

| Section System Number | Area Number | Availability of Notification |
|---|---|---|
| 101 | 4 | ○ |
| 102 | 5 | × |

Fig. 12A

| Destination IP Address | Transmission Source IP Address | Data Body | | | | |
|---|---|---|---|---|---|---|
| | | Data Length | Body Name | BSSID | Section System Number | Area Number |

Fig. 12B

RELAYING DEVICE, VOICE COMMUNICATION SYSTEM, AND VOICE COMMUNICATION METHOD

TECHNICAL FIELD

The present invention relates to a voice communication system using a network such as a wireless LAN.

BACKGROUND ART

A mainstream of devices performing wireless voice communication has been a so-called wireless communication apparatus which modulates and transmits a high frequency carrier, which is a continuous time signal, with an analog signal or a digital signal. The wireless communication apparatus basically performs one-to-one communication, but those provided with a group communication function for communication among a plurality of wireless communication apparatuses at the same time are also proposed.

Moreover, as disclosed in Japanese Patent Laid-Open No. 2010-109506, a wireless communication system (trunking wireless apparatus system) constituted by a server, a repeater, a wireless communication apparatus and the like is also proposed. In this system, each of the plurality of repeaters plays a role of a relaying device relaying among the wireless communication apparatuses. The server is capable of making various settings of the repeater. In this system, many wireless communication apparatuses can be handled.

CITATION LIST

Patent Literature

[Patent Literature 1] Japanese Patent Laid-Open No. 2010-109506

SUMMARY OF INVENTION

Technical Problem

In the aforementioned trunking wireless apparatus system, it is difficult to virtually form a plurality of systems with a single system. In a single building containing a plurality of business companies, for example, a communication system using a wireless communication apparatus for each of the business companies is desirably realized. However, only with the single system, electric waves of the communication reach other business companies, and each business company needs to introduce the system, respectively. On the other hand, an introduction cost of such a system is desirably kept as low as possible. Moreover, a system having a communication function such as calling of only the wireless communication apparatus present in an area in the vicinity of itself while complication of management of the system is suppressed is in demand.

The present invention has an object to provide a voice communication system realizing a plurality of virtual voice communication systems capable of calling of a terminal device for every area in a single voice communication system by connecting a relaying device with a terminal device as a communication apparatus via a communication network and having communication management among the terminal devices based on belonging of the terminal devices and management of a current position of each of the terminal devices executed on the relaying device side, and a relaying device, a wireless access point, and a voice communication method used in this system.

Solution to Problem

A relaying device of the present invention comprises a network communication unit, a storage unit, and a control unit and relays voice communication of a plurality of section systems. The network communication unit is connected to a communication network and communicates with a plurality of terminal devices connected to this communication network. The storage unit stores area information for each of the section systems, which is obtained by dividing a region of the system into a plurality of areas, and stores an identification code, a belonging section system, and position information of each of the terminal devices. The control unit deduces, when receiving a voice signal from a certain terminal device, the section system to which the certain terminal device belongs from information of a transmission source terminal device added to the voice signal. The control unit determines a specified area which is an area specified for transferring the voice signal thereto. The control unit transfers the voice signal to the terminal device belonging to the same section system as that of the certain terminal device and located in the specified area.

The aforementioned invention may be in the following aspect. The communication network has a plurality of wireless access points. The storage unit stores the wireless access points to which the terminal devices are connected as the position information of the terminal devices. The control unit specifies an area including a communication range of the wireless access point to which the certain terminal devices is connected as the specified area.

The aforementioned invention may be in the following aspect. The control unit makes a transmission request of a belonging area of each of the section systems to the plurality of wireless access points. The storage unit stores the belonging area of each of the section systems received from the wireless access point as the area information of each of the section systems.

In the aforementioned invention, the identification code of the terminal device may be uniquely given to each of the terminal devices in each of the section systems, and the information of the transmission source terminal device added to the voice signal may be the belonging section system and the identification code.

In the aforementioned invention, the identification code of the terminal device may be uniquely given to all the plurality of terminal devices, and the information of the transmission source terminal device added to the voice signal may be the identification code.

A wireless access point of the present invention comprises a storage unit and a control unit, and communicates with a terminal device and a relaying device via a network. The relaying device relays communication of a part of a specified area in each of a plurality of section systems. The storage unit stores one or more of the section systems to which the wireless access point itself belongs and a belonging area in the belonging section system. The control unit transmits information including the belonging section system, the belonging area, and an own identification code of the wireless access point when it receives a transmission request from the relaying device.

A voice communication system of the present invention comprises a relaying device and a terminal device communicating via a network and a wireless access point communicating with the terminal device as an apparatus constituting a part of the network, and the relaying device relays voice communication of a plurality of section systems. The relaying device stores a plurality of pieces of area information divided on the basis of a communication range of the wireless access point for each of the section systems. The relaying device stores an identification code of each of the terminal devices, a belonging section system, and position information based on the wireless access point being connected. The terminal device transmits a voice signal to which its own identification code is added. When the relaying device receives the voice signal from the terminal device, it deduces the section system to which this terminal device belongs from the identification code added to the voice signal as well as an area in the section system in which the terminal device is located on the basis of the position information. Then, the relaying device transfers the voice signal to the terminal device belonging to the deduced section system and located in the deduced area.

The aforementioned invention may be in the following mode. The relaying device makes a transmission request of a belonging area for each of the belonging section systems to the wireless access point. When the wireless access point receives the transmission request from the relaying device, it transmits information including the belonging section system, the belonging area, and its own identification code to the relaying device. The relaying device stores the belonging area for each of the section systems received from the wireless access point as the area information of each of the section systems.

A voice communication method of the present invention executes the following procedures on a voice communication system comprising a relaying device and a terminal device communicating via a network and a wireless access point communicating with the terminal device as an apparatus constituting a part of the network, the relaying device relaying the voice communication of a plurality of the section systems. In the relaying device, a plurality of pieces of area information divided on the basis of a communication range of the wireless access point is stored for each of the section systems. In the relaying device, the identification code of each of the terminal devices, the belonging section system, and position information based on the wireless access point being connected are stored. The terminal device transmits a voice signal to which its own identification code is added. When the relaying device receives a voice signal from the terminal device, it deduces the section system to which the terminal device belongs from the identification code added to the voice signal as well as an area in the section system in which the terminal device is located on the basis of the position information. The relaying device transfers the voice signal to the terminal device belonging to the deduced section system and located in the deduced area.

Advantageous Effect of Invention

According to the present invention, by connecting the relaying device and the terminal device which is the communication apparatus via the communication network and by having communication management among the terminal devices based on belonging of the terminal devices and management of the current position of each terminal device performed on the relaying device side, in the single voice communication system, a plurality of virtual voice communication systems capable of calling of the terminal device in the area can be realized.

BRIEF DESCRIPTION OF THE DRAWINGS

FIG. 7A is a view illustrating a terminal table set for the server.

FIG. 7B is a view illustrating an area table set for the server.

FIG. 7C is a view illustrating a group table set for the server.

FIG. 8A is a view illustrating a mixing table set for the server.

FIG. 8B is a view illustrating the mixing table set for the server.

FIG. 8C is a view illustrating the mixing table set for the server.

FIG. 12A is a view illustrating a belonging area table set for the wireless access point.

FIG. 12B is a view illustrating an example of configuration of a UDP packet.

DETAILED DESCRIPTION OF THE EMBODIMENT

Figure 1:
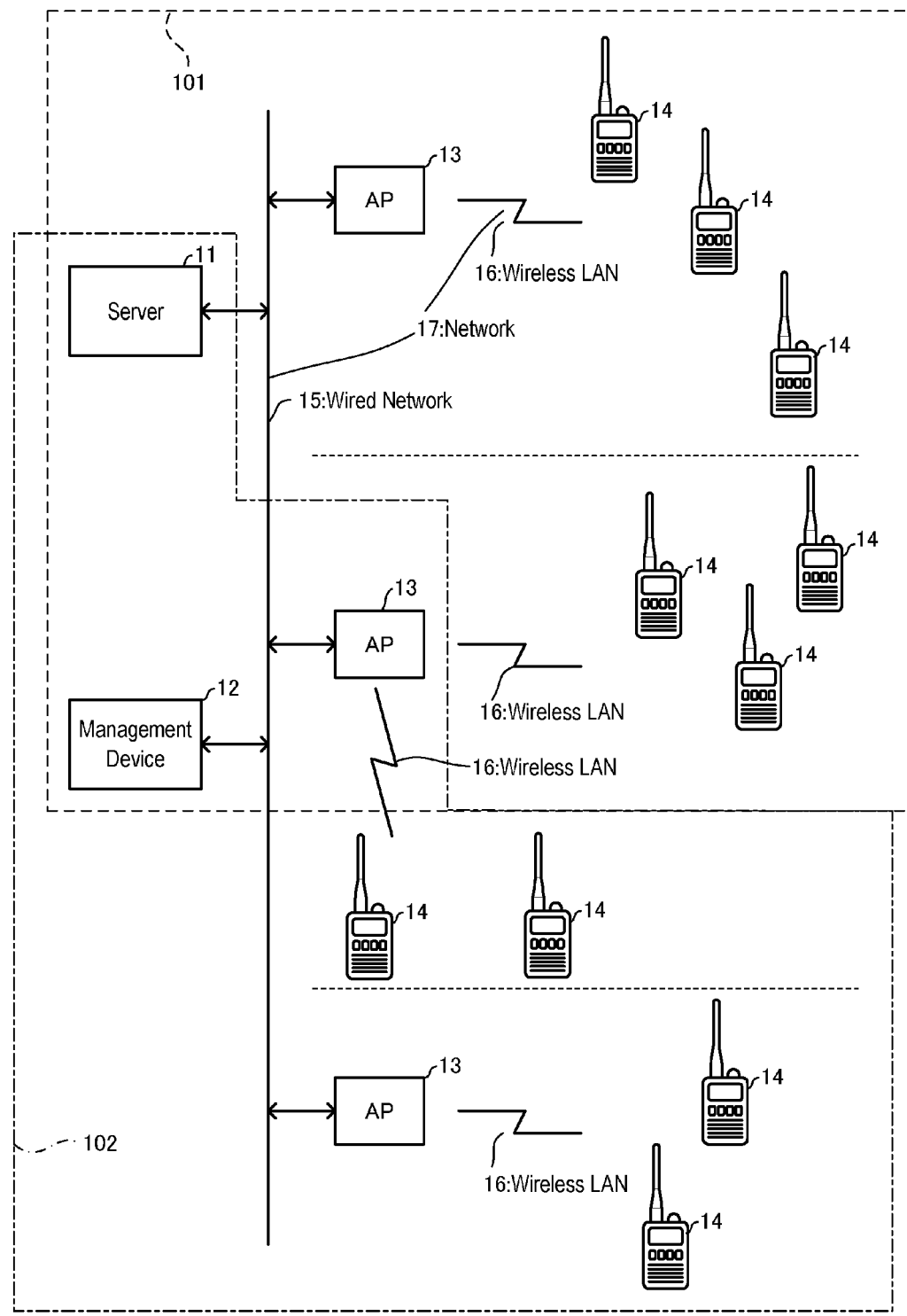
FIG. 1 shows a configuration of a voice communication system according to an embodiment of the present invention.
Figures 3, 4:
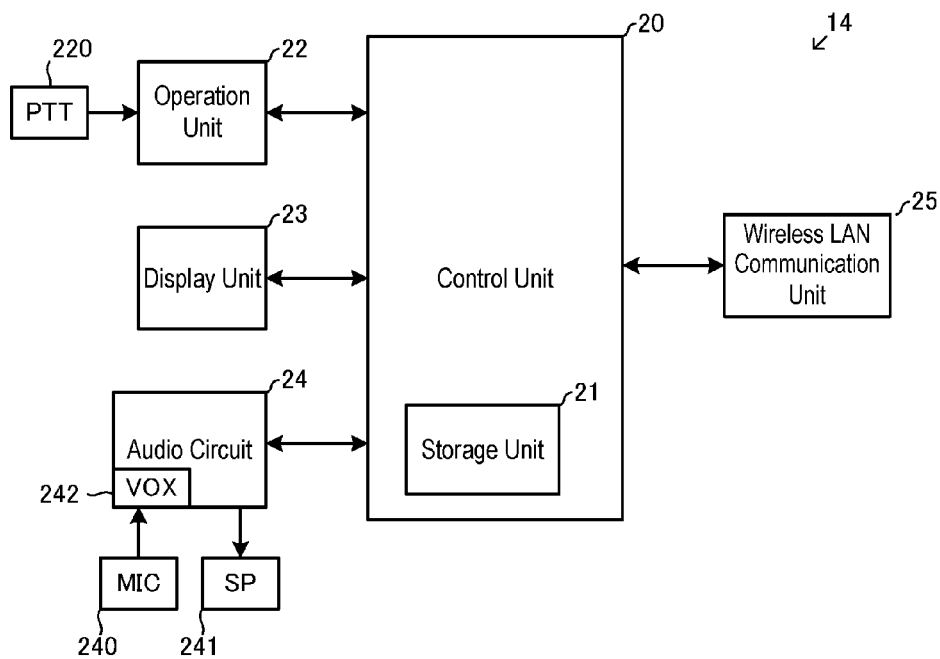
FIG. 3 is a block diagram of a transceiver as a terminal device.
FIG. 4 is a view illustrating an example of configuration of a voice packet (RTP packet).

A voice communication system of the present invention will be described by referring to the attached drawings. FIG. 1 shows a configuration of the voice communication system according to an embodiment of the present invention. In this voice communication system, a plurality of terminal devices 14 communicates with each other by using a wireless LAN (local area network) 16 such as Wi-Fi. The terminal device 14 has a shape resembling a handy transceiver for wireless communication and comprises a PTT (push-to-talk) switch 220 as illustrated in FIG. 3. The terminal device 14 is a wireless network device for transmitting/receiving a voice packet via a wireless access point (AP) 13 in view of a function. A server 11 as a relaying device relays communication between the terminal devices 14 via a wired network 15 and the wireless LAN 16 of the plurality of terminal devices 14. Hereinafter, the wired network 15 and the wireless LAN 16 are collectively called a network 17.

The wireless access points 13 are installed in plural. The wireless access points 13 are installed on each floor or in each room of a building, for example. Each of the wireless access points 13 has a cover area of the whole of or a part of the floor or the room in which it is installed. The server 11 can estimate on which floor or in which room the terminal device 14 is located on the basis of the cover area of which wireless access point 13 the terminal device 14 is located.

The server 11 is capable of constructing a plurality of (two in this embodiment) section voice communication systems 101 and 102 in the voice communication system. That is, conventionally, the plurality of voice communication systems are constructed by providing separate servers 11, respectively, but this server 11 divides the plurality of terminal devices 14 connected to itself into a plurality of groups and controls transfer of the voice signal and the like so that each group virtually looks as if it is an independent voice communication system (section voice communication systems 101 and 102), respectively. The terminal devices 14 belonging to each of the section voice communication systems 101 or 102 can communicate only with the terminal device 14 belonging to the same systems 101 and 102.

This voice communication system can be suitably applied to a case in which there are a plurality of business companies in one building or to a case in which there are a plurality of business companies and shops in one shopping street. For example, this voice communication system is provided in one building in which business companies A and B are located, and the section voice communication system 101 is installed for the business company A, while the section voice communication system 102 is installed for the business company B. In the aforementioned example, even if the business companies A and B share the wireless access point 13 on the same floor, the terminal device 14 is capable of communication only with the terminal device 14 belonging to the same system. As a result, the voice communication system (section voice communication systems 101 and 102) exclusively for the business companies A and B can be constructed by one unit of the server 11, whereby the communication between the terminal devices 14 limited to each of the business companies is made possible.

The terminal device 14 accesses the server 11 through the wireless access point 13 when it is started. The server 11 transmits setting data to the terminal device 14 and sets up the terminal device 14 into a state capable of communication. The setting data transmitted by the server 11 includes a number of the section voice communication system 101 or 102 (section system number) to which this terminal device 14 belongs, a terminal number with which this terminal device 14 can communicate, an update program and the like.

As the wired network 15, an Ethernet (registered trademark) LAN and the internet can be used. If the internet is included in the network 17, safe communication can be realized by using VPN (virtual private network). Moreover, as the wireless LAN 16, a communication method conforming to IEEE802.11 such as Wi-Fi can be applied. The terminal device 14 and the wireless access point 13 communicate with each other by the communication method of this wireless LAN 16.

The wireless access points 13 are installed in plural as described above. Each of the wireless access points 13 is installed on each floor or each room of a building, respectively, for example, and the whole of or a part of each floor or room is its communication range. As a result, depending on with which wireless access point 13 the terminal device 14 is communicating, on which floor/in which room the terminal device 14 is located can be estimated. All the communicable ranges of the terminal devices 14 in this voice communication system are divided into a plurality of areas in accordance with physical or functional sectioning of installed places of the wireless access points 13 such as the aforementioned floor, room and the like in management of the server 11 and a management device 12. The server 11 receives BSSID (information of the wireless access point 13) in communication from each of the terminal devices 14 and manages a current position of the terminal device 14.

The terminal device 14 communicates with another terminal device 14 in a form of individual communication, group communication, plenary communication (plenary calling) and neighborhood communication (neighborhood calling) within the section voice communication system 101 or 102 to which it belongs. The individual communication is a one-to-one communication form in which the terminal device 14 performs by calling another single terminal device 14. The group communication is a form in which the terminal device 14 calls a group set in advance and communication is performed with the terminal device 14 belonging to the group. The plenary communication is a form in which communication is performed with all the terminal devices 14 capable of communication within the section voice communication system 101 or 102 to which the terminal device 14 belongs by plenary calling of the terminal device 14. In the group communication and the plenary communication, three or more units of the terminal devices 14 are capable of mutual communication. The neighborhood communication is a form of communication with another terminal device 14 in the neighborhood of itself by making a neighborhood call of the terminal device 14. In this embodiment, a cover area (partial communication area) of the wireless access point 13 to which the terminal device 14 is connected is assumed to be a neighborhood range, that is, a neighborhood area. Details of the neighborhood area will be described later.

A user can select a desired form from these communication forms by operating his/her terminal device 14. Moreover, the neighborhood communication includes neighborhood plenary communication (a form of communication with all the terminal devices 14 capable of communication in the neighborhood area) and neighborhood group communication (a form of communication with the terminal device 14 belonging to the group set in advance among the terminal device 14 capable of communication within the neighborhood area). In this embodiment, when described as the neighborhood communication, it includes both the neighborhood plenary communication and the neighborhood group communication. The neighborhood plenary communication and the neighborhood group communication are both processed within a range of the section voice communication system 101 or 102 to which it belongs.

In this voice communication system, the terminal device 14 transmits a voice packet in which an identification number of a communication partner is added to a voice signal input from a microphone 240 (see FIG. 3) to the server 11 without performing a communication establishment procedure such as a SIP procedure when a PTT switch 220 (see FIG. 3) is turned on. The server 11 transfers the voice signal to the communication partner identified by the communication-partner identification number (see FIG. 4). As described above, in this voice communication system, since the communication is started by sending the voice packet (RTP packet), the user can start communication substantially at the same time as turning-on of the PTT switch 220 and can perform communication with a use feeling similar to that of a transceiver in conventional wireless communication. In order to realize such use feeling, management of an IP address or a group of each of the terminal devices 14 and transfer of the voice signal is performed by the server 11.

In FIG. 1, the management device 12 is connected to the wired network 15. The management device 12 is constituted by a personal computer in which a management program is installed or the like, for example. The management device 12 accesses the server 11 in accordance with an operation of an administrator and sets tables and the like as illustrated in FIGS. 7A and 7C in the server 11. Moreover, the management device 12 constructs the section voice communication systems 101 and 102. Specifically, the management device 12 accesses the server 11 in accordance with the operation of the administrator and sets a section system number corresponding to each of the terminal numbers in a terminal table 301 illustrated in FIG. 7A. As a result, the terminal device 14 with each of the terminal numbers is made to belong to the section voice communication system with the section system number set, respectively. The number of the section voice communication systems is not limited to 2 and may be 3 or more.

Moreover, the management device 12 also functions as one unit of the terminal device and is capable of communication with another terminal device 14. The management device 12 is capable of calling in the individual communication, the group communication, and the plenary communication and is also capable of calling in area specified communication. The area specified communication is a communication form in which a partial communication area is specified by an administrator (the user of the management device 12), and the management device 12 calls the terminal device 14 in the specified partial communication area and communicates with it. The area specified communication also includes area specified plenary communication (a form of communication with all the terminal devices 14 capable of communication within the specified partial communication area) and area specified group communication (a form of communication with the terminal device 14 belonging to the existing group set in advance in the terminal devices 14 within the specified partial communication area) similarly to the neighborhood communication. In this embodiment, when described as the area specified communication, the area specified plenary communication and the area specified group communication are both included. The area specified plenary communication and the area specified group communication of the management device 12 is processed within the section voice communication system 101 and/or 102 specified by the user. If both the section voice communication systems 101 and 102 are specified, processing is executed for all the terminal devices 14 capable of communication as targets via the network 17.

In the neighborhood communication, the neighborhood area, that is, the cover area of the wireless access point 13 to which the terminal device 14 is connected can be regarded as area selected communication selected as the partial communication area. In this case, selection of the partial communication area is made by the server 11 instead of the user.

Figure 2:
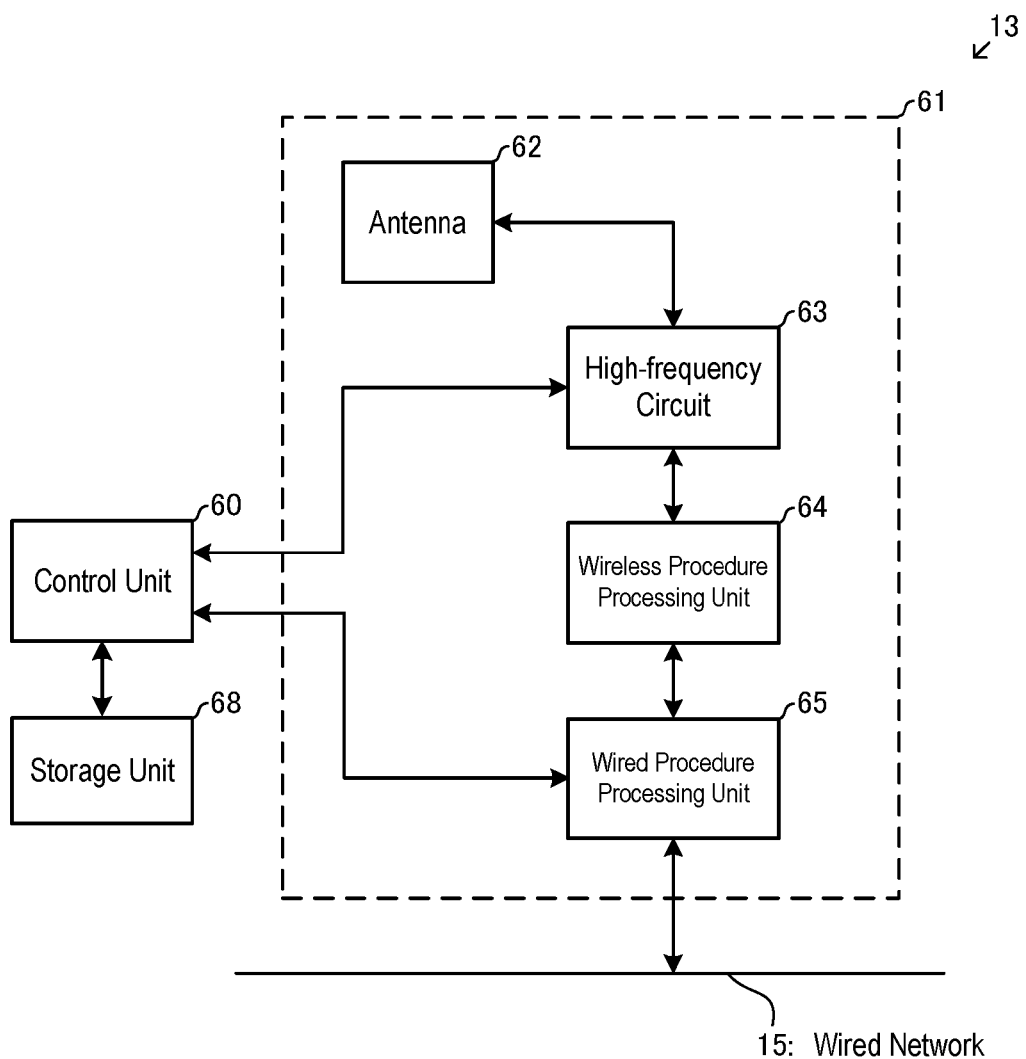
FIG. 2 is a block diagram of a wireless access point.

FIG. 2 is a block diagram of the wireless access point 13. The wireless access point 13 has a control unit 60, a network processing unit 61, and a storage unit 68. The control unit 60 controls an operation of the entire device in accordance with a processing program stored in the storage unit 68 and the like. The storage unit 68 is a non-volatile memory, for example, and stores its own BSSID, an IP address, a belonging area table 600 (see FIG. 12A) and the like in addition to the aforementioned processing program. The belonging area table 600 will be described later. The network processing unit 61 has an antenna 62, a high-frequency circuit 63, a wireless procedure processing unit 64, and a wired procedure processing unit 65.

The wireless procedure processing unit 64 executes a procedure in compliance with a protocol such as IEEE802.11 and the like and performs packet communication with the terminal device 14. The wired procedure processing unit 65 is a circuit which executes processing in compliance with IEEE802.3 (Ethernet (registered trademark)) and performs packet communication with a device connected to the wired network 15. The wireless procedure processing unit 64 and the wired procedure processing unit 65 exchange packets with each other. The high-frequency circuit 63 superposes a packet input from the wireless procedure processing unit 64 on a carrier signal of a predetermined channel and transmits a result from the antenna 62. Moreover, the high-frequency circuit 63 demodulates a signal received from the antenna 62 and takes out a packet and inputs this packet to the wireless procedure processing unit 64.

FIG. 3 is a block diagram of the terminal device 14. As described above, the terminal device 14 is a wireless network device for transmitting/receiving a voice packet through the wireless access point (AP) 13 of the wireless LAN in terms of functions. The control unit 20 controls an operation of the terminal device 14 and is configured by a microprocessor. The control unit 20 has a storage unit 21 storing various types of data. This storage unit 21 stores setting data downloaded from the server 11. To the control unit 20, an operation unit 22, a display unit 23, an audio circuit 24, and a wireless LAN communication unit 25 are connected. The operation unit 22 includes a key switch such as the PTT switch 220. The operation unit 22 receives the operation of the user such as turning on/off of a neighborhood calling mode, selection of the communication-partner identification number and the like and inputs its operation signal to the control unit 20. The communication-partner identification number is a number to be selected in order for the user to specify a communication partner (target device), and an individual number, a group number or a plenary number is used. The display unit 23 includes a liquid crystal display. The liquid crystal display displays the communication-partner identification number selected by the user's operation, the communication-partner identification number added to the incoming voice signal and the like.

The audio circuit 24 has the microphone 240 and a speaker 241. The control unit 20 decodes the received voice packet and inputs it to the audio circuit 24. The audio circuit converts this decoded audio signal to an analog signal and outputs it from the speaker 241. The audio circuit 24 converts the voice signal input from the microphone 240 to a digital signal and inputs it to the control unit 20. The control unit 20 makes this digital audio signal to a voice packet and inputs it to the wireless LAN communication unit 25. The wireless LAN communication unit 25 has a circuit performing wireless communication in the communication method in compliance with the aforementioned IEEE802.11. The wireless LAN communication unit 25 transmits the packet input from the control unit 20 to the wireless access point 13 and also inputs the packet received from the wireless access point 13 into the control unit 20.

When the user utters voice toward the microphone 240 while pressing on the PTT switch 220, the terminal device 14 edits this voice signal to a voice packet and transmits it toward the server 11.

The voice packet has configuration as illustrated in FIG. 4. A data body of the voice packet includes a communication-partner identification number, a transmission source terminal number, a section system number, area information, and a neighborhood communication flag in addition to the digitalized voice signal. The area information is information specifying a partial communication area in the case of the neighborhood communication or the area specified communication. In the case of the neighborhood communication the AP number (a number of the wireless access point 13 being connected) is written, while in the case of the area specified communication, AP number (area specifying information) of the partial communication area specified by an administrator (the user of the management device 12) is written. The area information may be written only in the case of the neighborhood communication or the area specified communication or may be written in a normal communication form.

In this embodiment, a BSSID of the wireless access point 13 is used as an AP number which is a number for identifying the wireless access point 13. Moreover, in this embodiment, a MAC address of the wireless access point 13 is used as the BSSID of each of the wireless access points 13. However, the AP number of the wireless access point 13 is not limited to the BSSID, and the BSSID of the wireless access point 13 is not limited to the MAC address.

The section system number is a number indicating the section voice communication system 101 or 102 or both (full section voice communication system) in this embodiment. If the management device 12 selects the full section voice communication system and performs communication, a number indicating the full section voice communication system is written as the section system number.

The neighborhood communication flag is a flag set in the case of the neighborhood communication or area specified communication. In the voice packet of this embodiment, the neighborhood communication flag is provided in the data body so that the neighborhood communication or the area specified communication can be identified by setting of the neighborhood communication flag. However, the neighborhood communication flag is not indispensable. For example, by means of setting that the area information is written only in the case of the neighborhood communication or the area specified communication, it can be determined whether the communication is the neighborhood communication, the area specified communication or ordinary communication by presence of the area information.

A header of the voice packet includes a destination IP address (destination address) and a transmission source IP address (sender address). While the destination IP address of the voice packet transmitted from the terminal device 14 has an IP address of the server 11 written, a final destination of the voice signal is not the server 11 but the terminal device of the communication partner specified by the communication-partner identification number.

When the server 11 receives the voice packet, it determines which of the section voice communication systems 101 or 102 this voice packet is destined to, that is, to which of the section voice communication systems 101 or 102 the terminal device 14 of the transmission source belongs on the basis of the section system number and transfers the voice signal of this voice packet to the terminal device 14 of the communication partner belonging to the section voice communication system 101 or 102 indicated by the section system number. Specifically, it is as follows. If the communication-partner identification number is a terminal number (individual communication), the voice signal is transferred to the terminal device 14 belonging to the same section voice communication system 101 or 102 and identified by its terminal number. If the communication-partner identification number is a group number (group communication), the voice signal is transferred to a plurality of the terminal devices 14 belonging to a group identified by the group number set to the same section voice communication system 101 or 102. If the communication-partner identification number is a plenary number (plenary communication), the voice signal is transferred to all the terminal devices 14 capable of communication in the same section voice communication systems 101 or 102. If the section system number is a value indicating the full section voice communication system and if the communication-partner identification number is a plenary number, the voice signal is transferred to all the terminal devices 14 capable of communication connected to the network 17. This communication form is used for emergency notification or the like.

If the communication-partner identification number added to the voice signal of the voice packet received by the server 11 is a group number and the neighborhood communication flag is set, this voice signal is a voice signal of the neighborhood group communication. In this case, the server 11 transfers the voice signal to the terminal device 14 in the neighborhood area in the plurality of terminal devices 14 belonging to that group in the same section voice communication systems 101 or 102. Moreover, if the communication-partner identification number is the plenary number and the neighborhood communication flag is set, it is the neighborhood plenary communication. In this case, the server 11 transfers the voice signal to the terminal device 14 in the neighborhood area in all the terminal devices capable of communication in the same section voice communication systems 101 or 102.

As described above, in this embodiment, the neighborhood communication flag is provided separately from the AP number so that whether it is a voice signal of the neighborhood communication or not can be determined on the basis of presence of setting of this neighborhood communication flag. The neighborhood communication flag does not have to be used, and it may be so configured that the AP number is set only if the neighborhood communication is specified, and whether it is a voice signal of the neighborhood communication or not is discriminated on the basis of presence of setting of this AP number, for example.

The neighborhood calling mode (neighborhood communication mode) of the terminal device 14 can be switched to ON/OFF by the user's operation of the terminal device 14. By pressing the PTT switch 220 in a state in which the neighborhood communication mode is ON, the user can perform the neighborhood communication. At this time, the terminal device 14 sets the neighborhood communication flag of the voice packet transmitted to the server 11. Since the neighborhood communication is aimed to communicate with an unspecified communication partner or the communication partner in the group in the neighborhood area within the same section voice communication system 101 or 102, in the state in which the neighborhood communication mode is ON, the operation of the terminal device 14 may be limited so that selection of the specified one unit of the terminal device 14 as the communication partner (individual communication) is not accepted.

In this transfer of the voice signal, a new voice packet having the IP address of the terminal device 14 of its destination as the destination address and the IP address of the server 11 as the sender address is created. In this new packet, too, the communication-partner identification number, the section system number, the neighborhood communication flag, the area information, and the transmission source terminal number in the data body are the same as those in the voice packet received by the server 11 from the terminal device 14.

In FIG. 3, the terminal device 14 has a VOX circuit 242 together with the PTT switch 220. The VOX circuit 242 is a circuit which determines whether or not a talking voice (voice signal) has been input on the basis of an input level of the microphone 240 and its holding time. The VOX circuit 242 switches the device to a transmission state (PTT switch on) if it is determined that the talking voice has been input. The terminal device 14 may switch transmission on/off by using the VOX circuit 242 instead of the PTT switch 220 or together with the PTT switch 220. A transceiver of general wireless communication performs communication of a simplex method which cannot receive a wireless signal in a transmission state. On the other hand, since the terminal device 14 transmits/receives the voice signal in the voice packet communication via the wireless LAN 16, transmission of the voice packet and reception of the voice packet can be performed in parallel. Communication in a full duplex method in which transmission and reception of the voice signal is performed in parallel at the same time can be performed by using this function. However, even if full-duplex communication is performed, the terminal device 14 edits and transmits the voice packet only when the talking voice is input by the function of the PTT switch 220 or the VOX circuit 242 so that a voiceless voice packet is not continuously transmitted.

Figure 5:
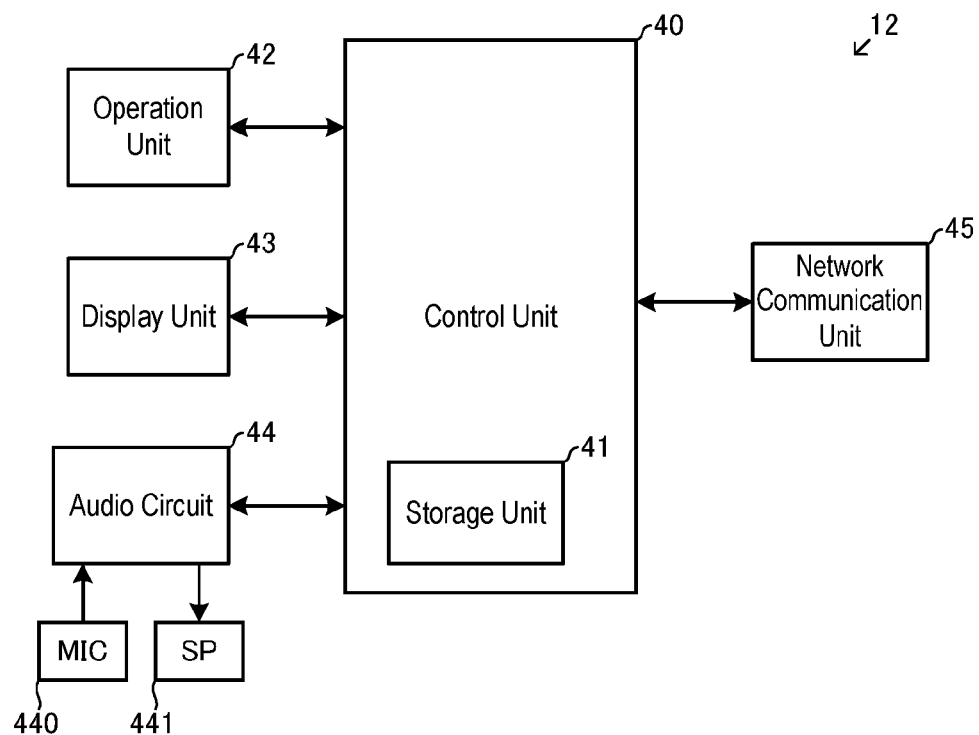
FIG. 5 is a block diagram of a management device.

FIG. 5 is a block diagram of the management device 12. As described above, the management device 12 is constituted by a personal computer in which the management program is installed, for example. The management device 12 has a control unit 40, a storage unit 41, a network communication unit 45, an operation unit 42, a display unit 43, and an audio circuit 44. The management device 12 accesses the server 11 in accordance with the administrator's operation and is capable of voice communication with another terminal device 14 similarly to the terminal device 14. The operation unit 42, the display unit 43, and the audio circuit 44 may be externally provided.

The control unit 40 executes a management program stored in the storage unit 41 and the like and accesses the server 11 in accordance with the administrator's operation and controls the operation of the device so as to perform communication with another terminal device 14 similarly to the terminal device 14. The storage unit 41 is constituted by a hard disk, a RAM and the like, for example. The network communication unit 45 controls communication with the wired network 15.

The operation unit 42 includes input device such as a keyboard, a mouse and the like, for example, and receives the user's operation and inputs its operation signal into the control unit 40. The operation signal input from the operation unit 42 includes setting/cancellation of the area specified communication mode, area specification, start/end of a talk (PTT operation) and the like, for example. The display unit 43 includes a liquid crystal display. The liquid crystal display displays an operation screen for making table setting of the server 11, and an operation screen for area specification and the like. Moreover, the liquid crystal display also displays the communication-partner identification number selected by the user's operation and the communication-partner identification number of the incoming voice signal.

As described above, the management device 12 is capable of voice communication similarly to the terminal device 14. The communication forms executable by the management device 12 are individual communication, group communication, plenary communication, and area specified communication (area specified group communication and area specified plenary communication). The management device 12 executes communication of these forms by processing substantially similar to that of the terminal device 14. When the area specified communication is to be performed, the AP number specified by the administrator is written in the area information of the voice packet transmitted by the management device 12 to the server 11.

Moreover, processing of the management device 12 and the server 11 when the area specified communication is performed is substantially similar to the processing of the management device 12 and the server 11 when the terminal device 14 performs the neighborhood communication except that the section system number and the AP number input by the administrator are set as the section system number and the AP number of the voice packet (see FIG. 4). That is, by specifying the section system number and the specified area communication through the administrator's operation of the management device 12 and by specifying the area, the section system number and the area specified communication flag are set to the voice packet transmitted to the server 11, and the AP number belonging to the area specified as the connected AP number is set. The area specified communication flag is the same flag as the neighborhood communication flag and shall be described below as the neighborhood communication flag.

If the communication partner's identification number of the voice packet is the group number and the neighborhood communication flag is set {area specified communication (group)}, for example, the server 11 transfers the voice signal to the terminal device 14 located in the specified area (connected AP number) in the plurality of terminal devices 14 belonging to the group in the section voice communication system 101 or 102 with the section system number of the voice packet. Moreover, if the communication partner's identification number of the voice packet is the plenary number and the neighborhood communication flag is set {area specified communication (plenary)}, the server 11 transfers the voice signal to the terminal device 14 located in the specified area (connected AP number) in all the terminal devices 14 capable of communication in the section voice communication system 101 or 102 with the section system number of the voice packet.

The server 11 transfers the voice packet (voice signal) input from the terminal device 14 via the network 17 to another terminal device 14 further via the network 17. In the case of the group communication, the voice signal is transferred to the plurality of terminal devices 14 belonging to the group. In the case of the group communication, the users of the plurality of terminal devices 14 start talking at the same time and the voice packets are transmitted from the plurality of terminal devices 14 at the same time in some cases. In this case, the server 11 mixes the voice signals of these plurality of voice packets so as to edit a new voice packet and transfers this new voice packet to each of the terminal devices 14. All the voice signals are mixed and transferred to the terminal device 14 not transmitting the voice signal, while the voice signal transmitted by the terminal device 14 is removed and the voice signals other than that are mixed and transferred to the terminal devices 14 transmitting the voice signals. As a result, an echo of the voice signal transmitted by its own device is not generated in the terminal device 14 transmitting the voice signal. Even in communication in the forms of the plenary communication and the neighborhood communication (area specified communication), mixing is performed in the form similar to that of the group communication.

Figure 6:
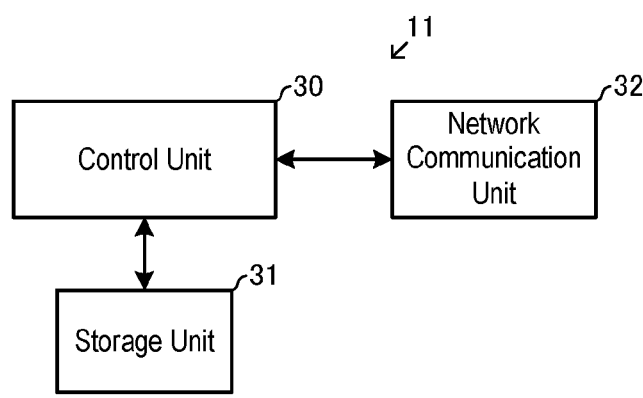
FIG. 6 is a block diagram of a server.

FIG. 6 is a block diagram of the server 11. The server 11 has a control unit 30, a storage unit 31, and a network communication unit 32. The storage unit 31 is constituted by a hard disk, a RAM and the like, for example, and stores various tables illustrated in FIGS. 7 and 8, setting data of each of the terminal devices 14 and the like. The control unit 30 performs setup of the terminal device 14 and mixing of the voice signals. The network communication unit 32 controls communication with the wired network 15.

FIGS. 7A, 7B, 7C, 8A, 8B, and 8C are views illustrating tables provided in the storage unit 31 of the server 11.

FIG. 7A is a view illustrating the terminal table 301. Each of the terminal devices 14 is identified by a TRX number uniquely assigned to each. The TRX numbers are identification codes uniquely assigned to all the terminal devices 14 used in this voice communication system, that is, all the terminal devices 14 of all the section voice communication systems 101 and 102 managed by this server 11. Moreover, the section system number and the terminal number are also stored in association with each of the TRX numbers. The section system number specifies to which of the section voice communication systems 101 or 102 the terminal device 14 belongs. The terminal number is a calling code uniquely assigned to the terminal devices 14 in each of the section voice communication systems 101 and 102, respectively. Therefore, as illustrated in the terminal table 301, there are the terminal devices 14 with the same terminal number in the different section voice communication system numbers 101 and 102. The terminal table 301 further stores an IP address, an active flag, a storage address of setting data, and a connected AP number in correspondence with the TRX number. The IP address is an address of the terminal device 14 on the network 17. Regarding the IP address, when an access (registration request) is made by the terminal device 14, the server 11 stores its address. The active flag is a flag indicating that the terminal device 14 is connected to the network 17, and an access is made to the server 11 so as to make registration by the server 11 and to receive download of various types of data, that is, registration has been completed and communication is available. The active flag is set by the server 11 which has completed registration of the terminal device 14. The setting data includes firmware (an update data of the program), the number of the section system to which the device itself belongs, the group to which the device itself belongs, a directory recording other groups for which communication is allowed and the like. The connected AP number is information for identifying the wireless access point 13 to which the terminal device 14 is connected. It is used as the information for specifying in which area the terminal device 14 is located.

FIG. 7B is a view illustrating area tables 304 (304A, 304B). The area table 304A illustrates area information of the section voice communication system 101. The area table 304B illustrates area information of the section voice communication system 102. The area tables 304 store numbers of a plurality of the areas obtained by dividing an overall communicable area of the terminal device 14 and BSSID (information of the wireless access point 13) installed in each area in association with each other. The server 11 specifies the area in which the terminal device 14 is located on the basis of the connected AP number of the terminal table 301 and the area tables 304. Creation of the area tables 304 will be described later.

When the terminal device 14 is started, it is connected to the network 17. The server 11 makes registration of the terminal device 14 by communicating with the terminal device 14 when the terminal device 14 is connected to the network 17 and at appropriate timing after that. The "appropriate timing after that" is when the wireless access point 13 in connection is switched and/or every certain period of time, for example. The terminal device 14 transmits the voice packet including the registration request to the server 11 at the timing. The server 11 performs registration of the terminal device 14 on the basis of the received registration request and update of each piece of information of the terminal table 301. The update of the terminal table 301 includes update (change) of the position information (information of connected AP number) of the registered terminal device 14. That is, the server 11 can grasp the latest position of each of the terminal devices 14 and to which area in the areas illustrated in FIG. 7B each of the terminal devices 14 belongs by updating the information of the connected AP number of the terminal table 301 illustrated in FIG. 7A on the basis of the received registration request. It may be so configured that the management device 12 updates the position information (connected AP number) of the terminal table 301. That is, the administrator may manually update the information instead of automatic update by the server 11.

The registration request is also transmitted to the server 11 in a format of a voice packet. The voice packet including the registration request is a packet (RTP packet) in the same format as that of the packet illustrated in FIG. 4, but since it is not a packet intended for transmission of a voice signal, the data body is configured only by control information without a voice signal. The control information includes information (flag) indicating that it is a registration request, the connected AP number, the transmission source terminal number and the like, for example. The communication-partner identification number is not required. The server 11 determines that it is a voice packet requesting registration when it receives the voice packet in this format and excludes it from a target of voice packet reception processing which will be described in FIG. 11A but executes another registration processing.

In the terminal table 301 in FIG. 7A, the terminal number "0" indicates the management device 12. That is, information of the management device 12 is stored in a line of the terminal number "0" of the terminal table 301. Since the management device 12 is managed by the administrator and is connected to the wired network 15, information of the section system number, the setting data storage address, and the connected AP number is not required and is not stored.

When information of another active terminal device 14, the directory and the like is downloaded by the registration processing, the terminal device 14 displays the terminal number of the aforementioned active terminal device 14 and the group number for which communication is allowed on the display unit 23 as a candidate of a communication partner in the user's selection operation of the communication partner.

When an operation of selecting the communication partner is performed by the user of the terminal device 14, the terminal number of the aforementioned active terminal device 14 and the group number for which communication is allowed are displayed on the display unit 23 of the terminal device 14 as the candidate of the communication partner.

FIG. 7C is a view illustrating group tables 302 (302A and 302B). The group tables 302 are tables for the server 11 to manage the group. The group table 302A stores group information of the section voice communication system 101. The group table 302B stores the group information of the section voice communication system 102. Group configuration of the group tables 302A and 302B of this embodiment is the same but may be different. Each group is identified by an identification number (group number) uniquely assigned to each group. The group table 302 stores the group number and the terminal number of the terminal devices 14 belonging to the group. The number of the terminal devices 14 belonging to a group may only be one or more. These terminal tables 301 and group tables 302 are set by the administrator operating the management device 12.

FIG. 8A is a view illustrating mixing tables (session tables) 303 (303A and 303B). FIGS. 8B and 8C illustrate registration examples of a neighborhood communication session and an area specified communication session to the mixing tables 303, respectively. The mixing tables 303 are tables for the server 11 to manage a communication session. The communication session is a communication state between a plurality of the terminal devices 14 using the server 11 as a relaying device. The mixing tables 303 have a plurality of lines, and information of one communication session (session group) is stored in each line. The mixing table 303A stores information of the communication session of the section voice communication system 101, while the mixing table 303B stores the communication session of the section voice communication system 102. Here, the communication session is a state in which a voice signal is mutually transferred between the plurality of terminal devices 14 using the server 11 as the relaying device. When the server 11 receives a voice signal (voice packet) from the terminal device 14, the server 11 determines from which communication session the voice signal is by referring the mixing tables 303.

The communication session is processed by the following procedure, for example. Establishment of the communication session, that is, setting of the mixing tables 303 is performed when a first calling voice packet to establish a communication session is received from the terminal device 14. A talking voice (for several seconds, for example) is divided into short (20 milliseconds in this embodiment) voice packets and transmitted/received. In the communication session, the talking voice of a reply to the previous talking voice is transmitted from another terminal device. An interval (silent time) between the previous talking voice and the talking voice in the reply is approximately 0 to few seconds. Holding time of a communication session is set to a maximum value or more of a silent time in general communication. The aforementioned basic procedure of a communication session is common in all the forms of the individual communication, the group communication, and the plenary communication, but a setting procedure of the mixing tables 303 is different according to the communication form.

The mixing tables 303A and 303B store a session number, a calling terminal number, a participating terminal number, an additional terminal number, an excluded terminal number, and remaining holding time (T1) for each communication session established in the section voice communication systems 101 and 102 in association with each other. Columns for the additional terminal number and the excluded terminal number among them are not indispensable. The table can be managed only by addition and exclusion of the terminal number with respect to a participating terminal number column. The information relating to the communication session in each line of the mixing tables 303A and 303B is created by the control unit 30 of the server 11 in accordance with transmission of the first voice packet (calling voice packet) by the calling terminal device to the server 11.

The session number is a number for identifying this communication session. The calling terminal number is the terminal number of the terminal device 14 which made a first call (transmission of a voice packet) starting this communication session. For the session number, an identification number (terminal number/group number/plenary number) of a communication partner written in the first voice packet is used. The communication session in which the terminal number ("19" in the mixing table 303A, for example) is registered as the session number is the communication session of the individual communication (individual communication session). The individual communication is communication between individual terminal devices 14 in a one-to-one manner. The communication session in which a group number ("G1" in the mixing table 303A, for example) is registered as the session number is a communication session of the group communication (group communication session). The group communication is communication in which the plurality of terminal devices 14 (3 units or more in general) mutually exchange voice signals. Moreover, the communication session in which the plenary number ("A" in the mixing table 303B, for example) is registered as the session number is a communication session of the plenary communication (plenary communication session). The plenary communication is a communication form in which the voice signal is transferred to all the active terminal devices 14 in the section voice communication system 101 or 102.

Moreover, even if the communication session is performed in the form of the neighborhood communication or the area specified communication, similarly to the above, the information of the communication session as illustrated in FIGS. 8B and 8C is stored in the mixing tables 303A and 303B. FIG. 8B illustrates the mixing tables 303A and 303B to which the neighborhood communication session is set, while FIG. 8C is a view illustrating the mixing table 303A to which the area specified communication session is set. As illustrated in FIGS. 8B and 8C, the mixing tables 303 do not store the information indicating that the communication is the neighborhood communication or the area specified communication, but the group number/plenary number is registered as the session number. Moreover, in the transmitted/received voice packet, the identification number (group number/plenary number) of the communication partner similar to that in the ordinary communication session is set.

The participating terminal numbers are a list of the terminal numbers of the terminal devices 14 participating in this communication session. When a voice packet is transmitted from the terminal device 14 whose terminal number is registered as the participating terminal number, the control unit 30 transfers the voice signal of this voice packet to another terminal device 14 whose terminal number is registered as the participating terminal number and realizes mutual communication between the participating terminal devices of the section voice communication system 101 (or 102).

In the case of the group communication session, the participating terminal number is the terminal number of the calling terminal device and the terminal number of the terminal device 14 belonging to the group specified by the communication partner. However, the terminal device 14 belonging to that group but not active or the terminal device 14 performing another individual communication session cannot participate in this group communication session and thus, the terminal numbers of those terminal devices 14 are excluded from the participating terminal numbers (registered in the column of the excluded terminal number). Moreover, if the calling terminal device is the terminal device 14 not belonging to this group, that is, if the calling terminal device calls a group other than the group to which it belongs, the terminal number of the calling terminal device is also registered as the participating terminal number. At the same time, the terminal number is also registered in the column of the additional terminal number as the additional terminal device temporarily registered as a member. That is, while this group communication session continues, the calling terminal device is handled similarly to the terminal device 14 belonging to the group.

In the case of the plenary communication session, the participating terminal numbers are the terminal number of the calling terminal device and the terminal numbers of all the terminal devices 14 capable of communication. The excluded terminal numbers are similar to the aforementioned group communication. The additional terminal numbers are not registered.

In the case of the individual communication session, the participating terminal number is only the terminal number of the calling terminal device and the terminal number of the terminal device 14 of the communication partner. Since it is one-to-one communication, the additional terminal number and the excluded terminal number are not registered.

In the case of the neighborhood group communication session, the terminal number of the calling terminal device and the terminal number of the terminal device 14 in the specified area (neighborhood area) in the terminal devices 14 belonging to the group in the section voice communication system 101 or 102 are registered as the participating terminal number. In the case of the neighborhood plenary communication session, the terminal number of the calling terminal device and the terminal number of the terminal device 14 in the specified area (neighborhood area) in all the terminal devices 14 capable of communication in the section voice communication system 101 or 102 are registered as the participating terminal number.

For example, in the neighborhood communication session (group) with the session number "G1" in the mixing table 303A in FIG. 8B, the terminal devices 14 with the terminal numbers "1" and "2" in the area (with the area number "1", for example) in which the terminal device 14 with the terminal number "3" as the calling terminal is located in the terminal devices 14 belonging to the group number "G1" of the section voice communication system 101 become the communication partners. Therefore, the participating terminal numbers with the session number "G1" are "1", "2", and "3". The terminal devices 14 with the terminal numbers "4" and "5" belonging to the group number "G1" but not located in the neighborhood area are registered as the excluded terminals.

Moreover, in the neighborhood plenary communication session with the session number "A" in the mixing table 303B in FIG. 8B, for example, the terminal device 14 with the terminal number "99" located in the area (with the area number "2", for example) in which the terminal device 14 with the terminal number "98" as the calling terminal is located in all the terminal devices 14 capable of communication of the section voice communication system 102 is the communication partner. Therefore, the participating terminal numbers with the session number "A" are "98" and "99".

In the case of the specified area group communication session, the terminal number of the management device 12 as the calling terminal device and the terminal number of the terminal device 14 located in the specified area in the terminal devices 14 belonging to that group in the specified section voice communication system 101 or 102 are registered as the participating terminal numbers. In the case of the area specified plenary communication session, the terminal number of the management device 12 as the calling terminal device and the terminal number of the terminal device 14 located in the specified area in all the terminal devices 14 capable of communication in the section voice communication system 101 or 102 are registered.

For example, in the area specified communication session with the session number "G2" in the mixing table 303A in FIG. 8C, the terminal devices 14 with the terminal numbers "8", "9", and "10" in the specified area in the terminal devices 14 belonging to the group number "G2" of the specified section voice communication system 101 are communication partners. Therefore, the participating terminal numbers with the session number "G2" are "0", "8", "9", and "10". The terminal devices 14 with the terminal numbers "6" and "7" belonging to the group number "G2" bug not located in the neighborhood area are registered as the excluded terminals.

The holding time of the mixing table 303 is time for holding this communication session without cancelling it in a state in which the voice packet is not transmitted from the participating terminal device. The holding time of each communication session in the server 11 is set to 30 seconds, for example. A holding time timer (TS) of the mixing table 303 is a timer for counting elapse of the holding time when the voice packet is not transmitted. The holding time timer TS is counted down if the voice packet is not transmitted in a processing operation (see FIG. 11) of the control unit 30 and is reset to 30 seconds if the voice packet is transmitted. If the timer TS is timed up since the voice packet is not sent from the participating terminal device for 30 seconds, this communication session is canceled, and information of this communication session is erased from the mixing table 303.

In order for the communication session to be continued, the holding time needs to be counted also in each of the terminal devices 14. Holding time (T1) of the terminal device 14 is shorter than the holding time (TS=30 seconds) of the server 11, and 5 seconds, for example, is set to the timer T1. The user can start another communication session by a predetermined operation when 5 seconds elapse after the PTT switch 220 is turned off, even if the communication session is maintained in the server 11.

Moreover, the mixing table 303 may be divided into two tables, that is, an executing mixing table and a retreat table. The executing mixing table is a table in which the session currently performing mixing is registered and is formed on a high-speed memory. The session in which the communication (transmission/reception of a voice packet) discontinues is transferred to the retreat table in a short time such as approximately 200 milliseconds and held only for the holding time (T1) in the retreat table. If communication (transmission/reception of the voice packet) occurs again during the holding time, the communication session is transferred to the executing mixing table again and is used for execution of mixing. As a result, each of the terminal devices 14 can be released from the mixing table 303 earlier.

Figure 9:
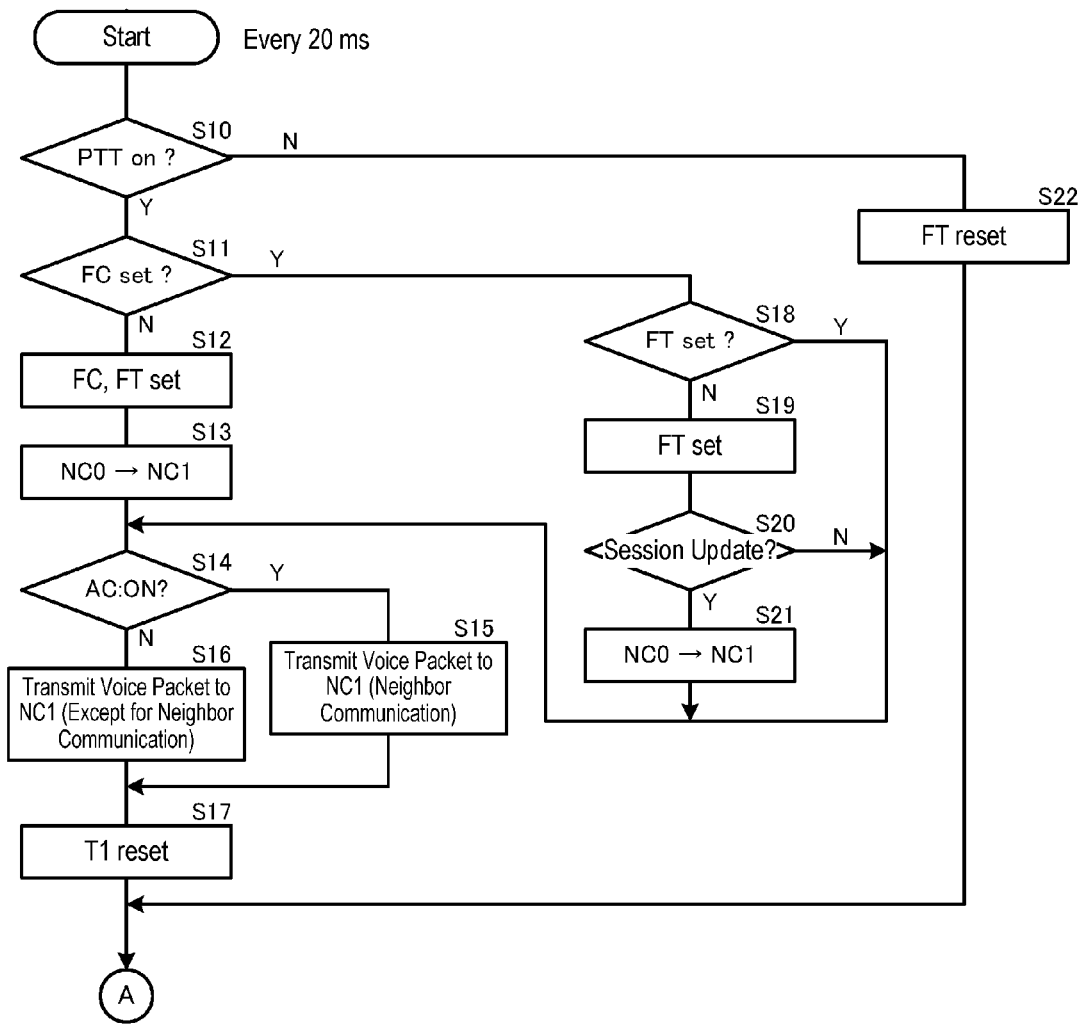
FIG. 9 is a flowchart illustrating an operation of a transceiver.
Figure 10:
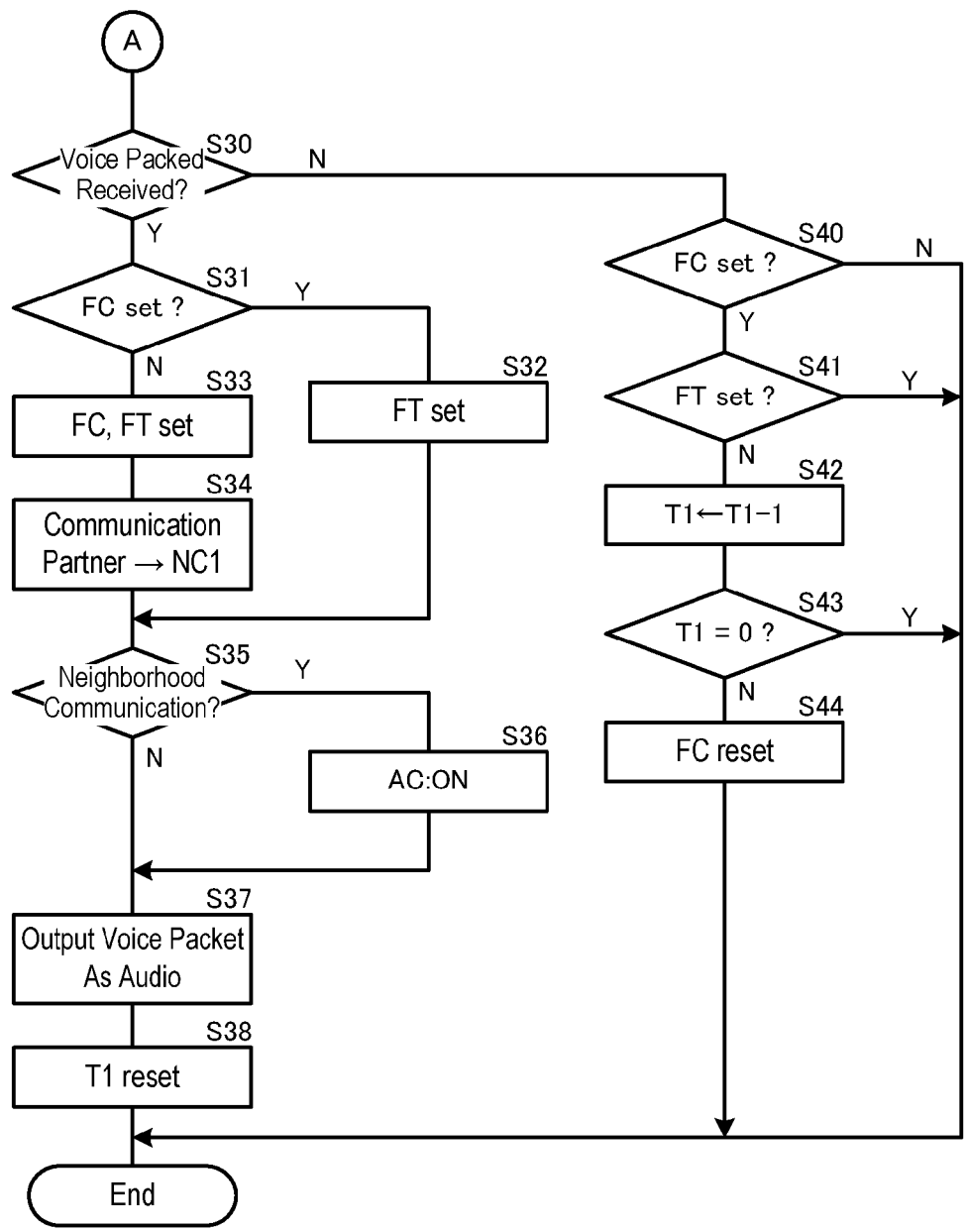
FIG. 10 is a flowchart illustrating the operation of the transceiver.

FIGS. 9 and 10 are flowcharts illustrating a communication control operation of the control unit 20 of the terminal device 14. This processing operation is executed repeatedly every 20 milliseconds. In this processing operation, the current communication state (status) is deduced in accordance with on/off of the PTT switch 220 or reception of a voice packet (RTP packet). Flags and timers used in the flowcharts are as follows.

PTT: This is abbreviation of the push-to-talk switch (PTT switch) 220 but is not limited to on/off of the PTT switch 220 but also includes on/off of a transmitted signal by the VOX circuit.

NC0: A communication-partner identification number (individual number/group number/plenary number) selected by the user's operation.

NC1: A session number, a number for identifying a communication session being executed, and a communication-partner identification number (individual number/group number/plenary number) written in the first voice packet for which the communication session is established are used.

FC: A communication session flag (flag indicating that this terminal device 14 participates in the communication session).

FT: A in-communication flag (flag indicating during transmission or during reception of a voice packet).

AC: A neighborhood communication flag (flag indicating that the communication session is the neighborhood communication or the area specified communication).

T1: A holding time timer (timer counting holding time (5 seconds) of a communication session.

S10 to S21 are transmission management processing of a voice packet. The control unit 20 determines the state of the PTT switch 220 (S10). If the PTT switch 220 is on, the control unit 20 proceeds the processing to S11. If the PTT switch 220 is not on, it proceeds the processing to S22. In the explanation of this flowchart, ON of the PTT switch includes ON of a transmission function by VOX.

At S11, the control unit 20 determines whether or not the communication session flag FC is set. If the communication session flag FC is not set (NO at S11), the voice packet created by turning-on of the PTT switch 220 this time is a calling voice packet, and by transmission of this voice packet, the communication is started by the server. The control unit 20 sets the communication session flag FC and the in-communication flag FT indicating that the voice packet is being transmitted/received (S12). Then, the control unit 20 transfers the communication partner number NC0 selected by the user to the communication session number NC1 (S13) and determines whether it is the neighborhood communication or the area specified communication on the basis of the neighborhood communication flag AC (S14). If the neighborhood communication flag AC is set, it is the neighborhood communication or the area specified communication. The neighborhood communication flag AC is switched to set/reset by the operation of the user of this terminal device 14. The calling from another terminal device 14 (neighborhood communication and area specified communication) also sets ON.

If the neighborhood communication flag AC is set at S14 (YES at S14), the control unit 20 transmits a voice packet in which the neighborhood communication flag (set), a wireless access point 13 number (area information, connected AP number (BSSID)) connected to the terminal device 14, the communication session number NC1, and the section system number are written in the data body together with the voice signal to the server 11 as a calling voice packet (S15). On the other hand, if the neighborhood communication flag AC is not set at S14 (NO at S14), the control unit 20 leaves the neighbor communication flag to be reset and transmits a voice packet in which the area information (BSSID), the communication session number NC1, and the section system number are written in the data body together with the voice signal to the server 11 (S16). By means of the transmission of this calling voice packet, the communication session is started by the server 11. The control unit 20 resets the holding time timer T1 to 5 seconds (S17) and then, proceeds the processing to reception management processing of the voice packet at S30 and after.

If the communication session flag FC has been already set at S11 (YES at S11), the control unit 20 determines whether the in-communication flag FT is set or not, that is, whether the voice packet is being transmitted or received (S18). If the in-communication flag FT is not set (NO at S18), the control unit 20 sets the in-communication flag FT (S19). The processing proceeds as S11→S18→S19 if transmission of a new voice packet (user's talking voice) is started in a state in which the communication session which has been already started is maintained. At S20, the control unit determines whether continues the communication session which has been already started and replies the current voice packet to the communication session (NO at S20) or exits the previous communication session and transmits the current voice packet to a new communication partner, that is, establishes an another new communication session (YES at S20). This determination may be made on the basis of whether an operation by the user immediately before the PTT switch 220 is turned on this time, a selection operation of the communication partner has been performed or not, for example. If the selection operation of the new communication partner has been performed by the user, it is only necessary to execute processing of establishing a new communication session to the communication partner selected in the determination at S20.

When the new communication session is to be established (YES at S20), the control unit 20 transfers the communication partner number NC0 selected at that time to the communication session number NC1 (S21) and proceeds the processing to S14. If the communication session which has been already started is to be continued (NO at S20), the control unit 20 proceeds the processing from S18 to S14 as it is.

At S10, if the PTT switch 220 is not turned on (NO at S10), the control unit 20 resets the in-communication flag FT (S22). If the in-communication flag FT has been already reset, it may be left as it is. After that, the control unit 20 proceeds the processing to the reception management processing of the voice packet at S30 and after.

The control unit 20 determines at S30 whether or not the voice packet has been received via the network 17. If the control unit 20 has received the voice packet, it proceeds the processing to S31. If the voice packet has not been received, the processing is proceeded to S40.

At S31, the control unit 20 determines whether the communication session flag FC has been set or not. If the communication session flag FC has not been set (NO at S31), it is determined that a new communication session is established this time, and its first voice packet is transmitted and then, the communication session flag FC and the in-communication flag FT are set (S33). The in-communication flag FT is a flag indicating that the voice packet is being transmitted/received. The control unit 20 transfers the communication-partner number included in the voice packet to the communication session number NC1 (S34). Subsequently, the control unit 20 determines whether the voice packet is the neighborhood communication/the area specified communication or not (S35). Specifically, the determination is made on the basis of presence of setting of the neighborhood communication flag of the voice packet. Whether it is the neighborhood communication or the area specified communication, the communication control operation is the same, and the neighborhood communication and the area specified communication are not discriminated. If it is the neighborhood communication or the area specified communication at S35 (YES at S35), the control unit 20 sets the neighborhood communication flag AC (S36) and proceeds the processing to S37. On the other hand, if it is neither of the neighborhood communication or the area specified communication at S35 (NO at S35), the processing is proceeded to S37. At S37, the control unit 20 output the voice packet to the audio circuit 24 and resets the holding time timer T1 to 5 seconds (S38).

If the communication session flag FC has been already set at S31 (YES at S31), the control unit 20 sets the in-communication flag FT in correspondence with reception of the current voice packet (S32). If the in-communication flag FT has been already set, it may be left as it is. After that, the control unit 20 proceeds the processing to S35.

If the voice packet has not been received at S30 (NO at S30), the control unit 20 determines whether or not the communication session flag FC has been set (S40). If the communication session flag FC is set (YES at S40), the control unit 20 executes the processing at S41 and after. If the communication session flag FC is not set (NO at S40), the control unit 20 finishes the processing as it is.

The control unit 20 determines at S41 whether or not the in-communication flag FT is set. If the in-communication flag FT is set (YES at S41), the control unit 20 finishes the processing as it is. If the in-communication flag FT is not set (NO at S41), that is, in a state in which the in-communication flag FT is reset but the communication session flag FC is set, the control unit 20 subtracts the holding time timer T1 by 1 count (20 milliseconds) (S42). Then, it is determined whether the holding time timer T1 has become 0 or not by this subtraction (S43). If the holding time timer T1 has become 0 (YES at S43), the control unit 20 resets the communication session flag FC in order to cancel the communication session (S44). If the holding time timer T1 is still larger than 0 at S43 (NO at S43), the control unit 20 finishes the processing as it is.

Figures 11A, 11B:
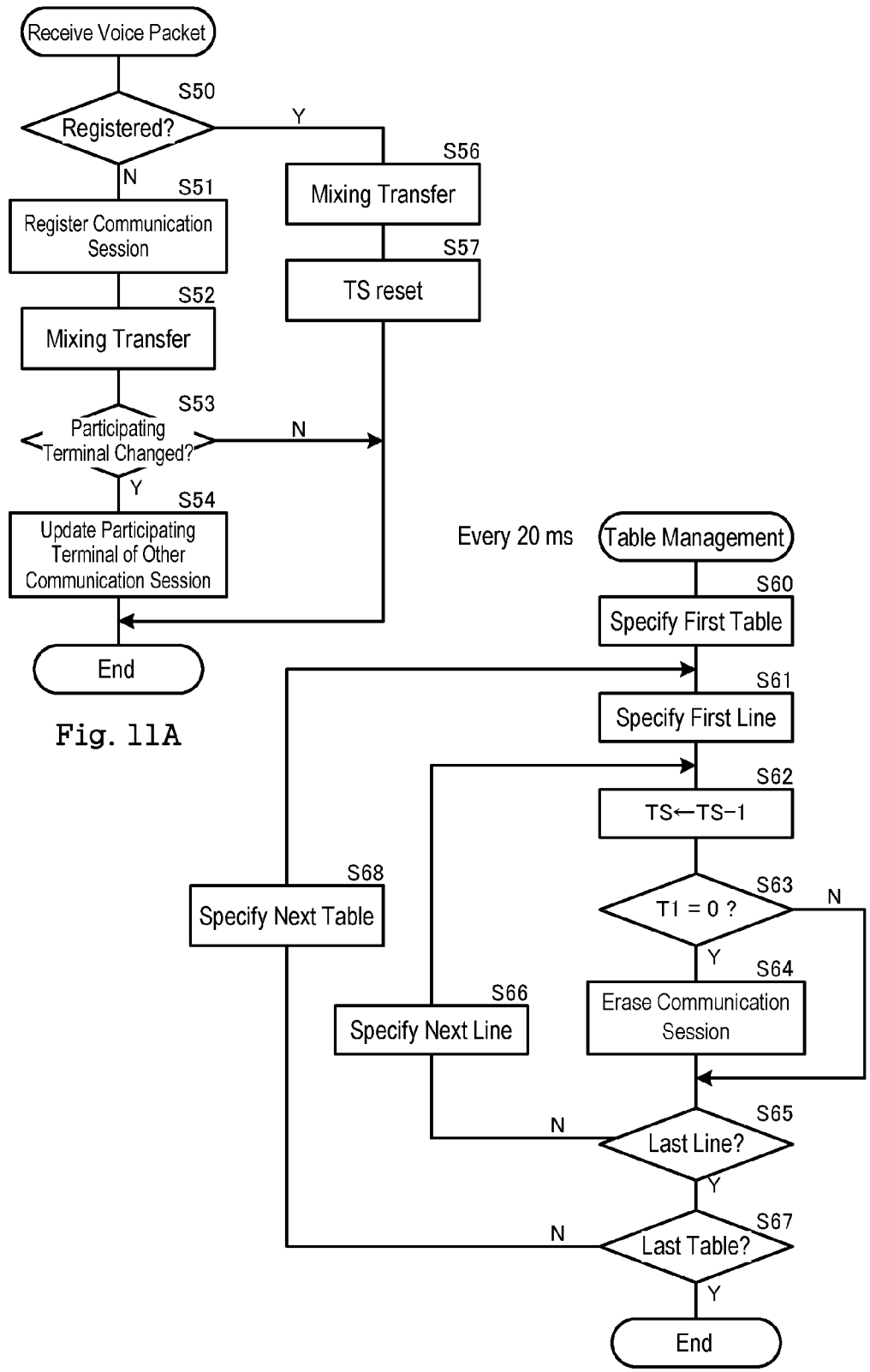
FIG. 11A is a flowchart illustrating an operation of the server.
FIG. 11B is a flowchart illustrating the operation of the server.

FIGS. 11A and 11B are flowcharts illustrating an operation of the server. FIG. 11A illustrates a processing operation when the voice packet is received. FIG. 11B illustrates a mixing-table management processing operation.

In FIG. 11A, if the control unit 30 receives the voice packet, it determines whether the communication session identified by the transmission source terminal number, the communication-partner identification number, and the section system number has been already registered in the mixing table 303A or 303B corresponding to this section system number (S50). If the communication session has been already registered in the mixing table 303A or 303B (YES at S50), the control unit 30 transfers the voice signal of the received voice packet to the terminal device 14 participating in that communication session on the basis of the participating terminal number of the communication session (S56). Then, the holding time timer TS of the communication session of the mixing table 303A or 303B is reset to 30 seconds (S57). As a result, this communication session is maintained in the server 11 for 30 seconds after that.

If the communication session of the received voice packet is not registered in the mixing table 303A or 303B (NO at S50), that is, if this voice packet is a calling voice packet, the control unit 30 registers a new communication session based on this calling voice packet in the mixing table 303A or 303B corresponding to the section system number of this calling voice packet (S51). In the mixing table 303A or 303B, the identification number (terminal number/group number/plenary number) of the communication partner is registered as a session number, and the terminal number of the terminal device 14 of the transmission source of this voice packet is registered as the calling terminal number. As the participating terminal number, in the case of the individual communication session, the communication partner number and the calling terminal number are registered, and in the case of the group communication session, the calling terminal number and the terminal number of the terminal device 14 belonging to the group of the communication partner number are registered. If the calling terminal device does not belong to a group, the calling terminal number is registered also in the additional terminal number. Moreover, if there is a terminal device that cannot participate in this communication session in the terminal devices 14 belonging to the group because of being inactive, participating in another communication session or the like, its terminal number is excluded from the column of the participating terminal number and is transferred to the column of the excluded terminal number. In the case of the plenary communication session, the terminal numbers of the terminal devices 14 of the calling terminal number and all the communication partner number are registered as the participating terminal numbers. Handling of the excluded terminal number is similar to that of the group communication session. In the case of the neighborhood communication session (area specified communication session), the terminal number of the terminal device 14 located in the neighborhood area (specified area) of the communication partner number (group number/plenary number) corresponding to the section system number of this calling voice packet is registered as a participating terminal number.

Subsequently, the control unit 30 transfers the voice signal of the received voice packet to the terminal device 14 participating in the communication session on the basis of the participating terminal number of the mixing table 303A or 303B (S52).

The control unit 30 determines whether there is a device to be excluded by the communication session established this time from the participating terminal devices of the communication session already registered in the mixing table 303A or 303B in which this communication session is registered (S53). That is, if the terminal device 14 participating in the communication session previously established is to participate in the communication session established this time, it needs to exit from the communication session previously established. If such terminal device 14 is present (YES at S53), the terminal number of this terminal device 14 is deleted from the column of the participating terminal number of the previously established communication session (S54). The excluded terminal number is transferred to the column of the excluded terminal number. The participating terminal device of the communication session is optimized as above.

The mixing table management processing in FIG. 11B is repeatedly executed regularly (every 20 milliseconds, for example). The control unit 30 first selects a first table 303A of the plurality of mixing tables 303A and 303B (S60). Then, a communication session on the first line of this mixing table 303A is specified (S61). The control unit 30 subtracts the holding time timer TS of the specified communication session by 1 count (20 milliseconds) (S62) and determines whether or not the holding time timer TS has become 0 by this subtraction (S63). If the holding time timer TS has become 0 (YES at S63), the control unit 30 considers that this communication session is finished and erases the communication session on this line (S64). On the other hand, if the holding time timer TS is not 0 (NO at S63), the control unit 30 proceeds the processing to S65.

The control unit 30 sequentially executes the aforementioned processing until a last line of the mixing table 303A is reached (S65, S66), and further sequentially executes the processing until the final table (mixing table 303B) of the mixing table 303 is finished (S67, 68). The control unit 30 executes management of each of the mixing tables 303A and 303B as above.

As described above, in the voice communication system of this embodiment, the relaying device (server 11) and the terminal device 14 as a communication apparatus are connected via the network 17, and the communication management between the terminal devices 14 based on the belonging of the terminal device 14 and the management of the current position (area) of each of the terminal devices 14 are executed on the relaying device side. As a result, in the single voice communication system, a plurality of virtual voice communication systems capable of calling of the terminal device 14 by the unit of area can be realized. Therefore, there is no need to introduce a required number of voice communication systems, and a cost increase required for introduction of a voice communication system having diversified communication functions can be suppressed.

(Creation of Area Table)

Subsequently, creation of the area tables 304 stored in the server 11 (storage unit 31) will be described. The area tables 304 are created by the server 11. Specifically, the server 11 transmits an area information request to each of the wireless access points 13 and receives information including the BSSID, the IP address, and the belonging area table 600 (section system number and area number) and creates the area tables 304. The server 11 receives a request start instruction from the management device 12, for example, and transmits the area information request.

FIG. 12A is a view illustrating the belonging area table 600 set to the wireless access point 13 (storage unit 68). In the belonging area table 600, information specifying an area number to which the wireless access point 13 belongs in each of the section voice communication systems 101 and 102 and information of the section system number, the area number, and availability of notification are registered in association with each other. For example, in the case of the section system number "101" (section voice communication system 101), it indicates that this wireless access point 13 belongs to the area number "4". The availability of notification is information for determining whether or not the information such as the belonging area table 600 is to be transmitted to the server 11 when the area information request is transmitted from the server 11. For example, in FIG. 12A, in the case of the section system number "102" (section voice communication system 102), since prohibition of notification is set, this wireless access point 13 transmits only the information corresponding to the section system number 101 to the request. That is because, if one of the wireless access points 13 is used only in either of the section voice communication systems 101 or 102, registration of the section voice communication 102 or 101 not in use in the area table 304B or 304A is not necessary.

The belonging area table 600 may be provided to the wireless access point 13 by communication with the terminal device such as a personal computer when the wireless access point 13 is to be installed, for example, and make setting in the storage unit 68. Alternatively, an operation unit may be provided at the wireless access point 13 so that a direct input can be made.

The server 11 transmits the area information request within a range from a start IP address to an end IP address received from the management device 12. That is, by transmitting the area information request using all the IP addresses in the aforementioned range as transmission destinations, information such as the area number is received from the discovered wireless access point 13 while searching the wireless access point 13 present within the network 17. Thus, the server 11 does not have to store the IP address of the wireless access point 13 in advance. Since the administrator grasps the range of the IP addresses in use, a range of the IP addresses to be searched can be easily specified.

The communication between the server 11 and the wireless access point 13 is performed in a format of a packet (UDP packet) illustrated in FIG. 12B. FIG. 12B is a packet when the wireless access point 13 which received the area information request responses (replies) to the server 11. The data body includes a data length of the data body (effective data length) and a body name (text data) indicating a name of the wireless access point 13 in addition to the aforementioned BSSID, the section system number, and the area number. In the case of the area information request transmitted from the server 11, the data body includes only the data length.

When the wireless access point 13 (control unit 60) receives the UDP packet for which the IP address of itself is set as the transmission destination IP address from the server 11 through the wired procedure processing unit 65, the wireless access point 13 determines it to be the area information request and returns the UDP packet illustrated in FIG. 12B on the basis of the setting of availability of notification. When the server 11 receives the UDP packet for which its own IP address is set as the transmission destination IP address from the wireless access point 13, the server 11 also determines it to be a response from the wireless access point 13 to the area information request and performs a creation operation of the area table 304.

Figure 13A:
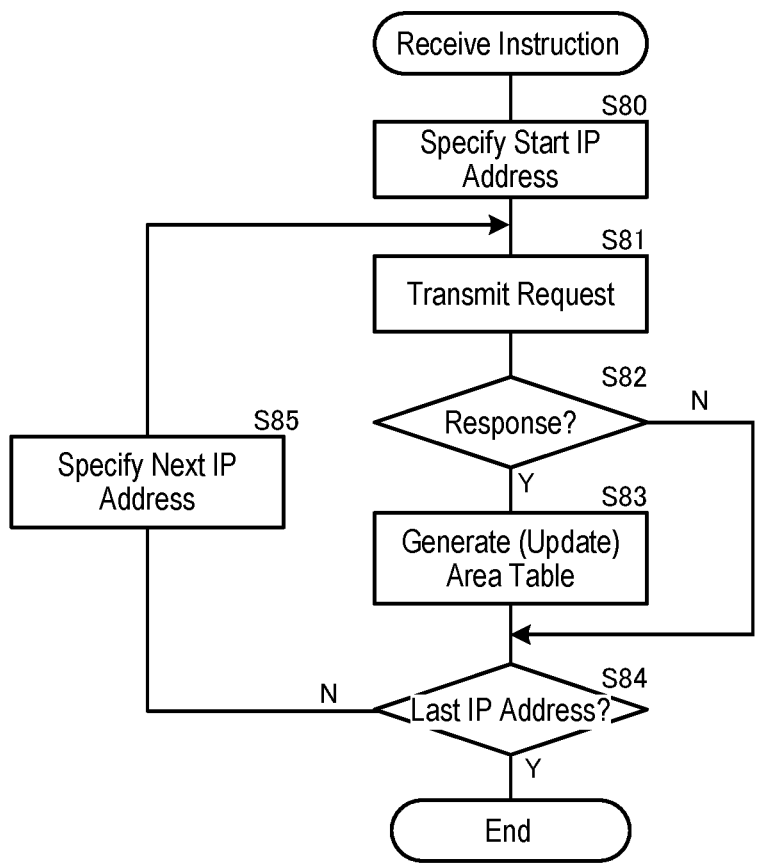
FIG. 13A is a flowchart illustrating the operation of the server.

FIG. 13A is a flowchart illustrating an area table creating operation of the control unit 30 of the server 11. This creation operation is performed when a request start instruction is received from the management device 12. The control unit 30 selects a start IP address at the first of a range from the start IP address to the end IP address received from the management device 12 (S80) and transmits the area information request (S81). Subsequently, the control unit 30 determines presence of a response from the wireless access point (S82). For example, after transmission of the area information request, the control unit 30 makes determination on the basis of whether there is a response from the wireless access point 13 within a predetermined time or not. If there is no response (NO at S82), the control unit 30 determines that the IP address does not correspond to the address of the wireless access point 13 and proceeds the processing to S84. On the other hand, if there is a response (YES at S82), the control unit 30 stores the received information in the RAM and the like and creates (updates) the area table 304 (S83). The control unit 30 sequentially executes the aforementioned processing until the end IP address is reached (S84, S85). Then, though not illustrated, the area table 304 created by the aforementioned processing is stored in the storage unit 31.

Figure 13B:
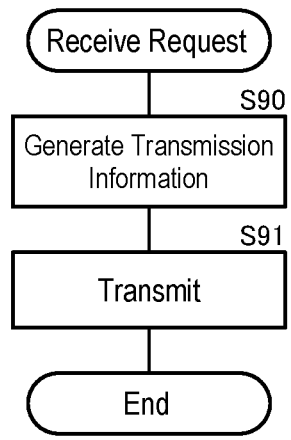
FIG. 13B is a flowchart illustrating an operation of the wireless access point.

FIG. 13B is a flowchart illustrating an area information transmission operation of the control unit 60 of the wireless access point 13. This operation is executed when the area information request destined to the IP address of this wireless access point 13 is received.

The control unit 60 creates information to be transmitted to the server 11 (S90). Specifically, the information of the section system number of the belonging area table 600 capable of notification and the corresponding area number is obtained on the basis of the setting of availability of notification of the belonging area table 600 stored in the storage unit 68, and the BSSID is obtained from the storage unit 68. Then, these pieces of information are transmitted to the server 11 (S91).

As described above, the server 11 searches the wireless access point 13 from an arbitrary IP address and obtains the area information of the wireless access point 13. Then, on the basis of the received area information, the area tables 304 are created. As a result, the administrator and the like can easily create the area tables 304 without a labor of inputting the area number and the BSSID of the corresponding wireless access point 13 and the like one by one in the server 11. Therefore, in the single voice communication system, a plurality of the virtual voice communication systems capable of calling the terminal device 14 by the unit of area can be realized while complication of the management of the voice communication system is suppressed.

The creation of the area table 304 does not have to be configuration of the aforementioned area information request. For example, the administrator may create the area tables 304 by accessing the server 11 through the management device 12 and by inputting the information such as the area number, BSSID and the like.

In the aforementioned embodiment, two section voice communication systems are formed in the single voice communication system, but the number is not limited to two. Moreover, the administrator can increase/decrease the number of the section voice communication systems by operating the management device 12 so as to change the settings of the terminal tables 301, the group tables 302, and the mixing tables 303 of the server 11. Moreover, the administrator can change belonging of the section voice communication systems 101 or 102 of the terminal device 14 by operating the management device 12 and by changing the section system number to which the terminal device 14 belongs in the terminal tables 301.

Moreover, in the aforementioned embodiment, the section system number to which the terminal device 14 of the transmission source belongs is added to the voice packet but it does not have to be added. For example, it may be so configured that a collective terminal number is written in the voice packet as the transmission source terminal number, and the server 11 having received the voice packet searches the terminal tables 301 with the transmission source terminal number (collective terminal number) and specifies the section system number to which the terminal device 14 of the transmission source belongs and the terminal number in its section voice communication system 101 or 102. In this case, the server 11 no longer needs to notify the section system number to the terminal device 14.

In the aforementioned embodiment, in the neighborhood communication, assuming that one area in which the terminal device 14 is located to be a neighborhood area, another terminal device 14 located in this area is a target of the communication partner but this is not particularly limiting. Assuming that the one area in which the terminal device 14 is located and areas around this area are a neighborhood area, other terminal devices 14 located in these areas may be targets of the communication partners. For example, it may be so configured that the server 11 stores the area information around each area and the area corresponding to the AP number and the areas around it are specified from the AP number (BSSID) of the voice packet received from the terminal device 14.

Moreover, in the aforementioned embodiment, the number (BSSID) of the wireless access point 13 is added to the voice packet, but this is not particularly limiting. For example, the area number may be added. In this case, by storing the area table 304 illustrated in FIG. 7B in the terminal device 14, the area tables 304 do not have to be located on the server 11 side. Then, the terminal device 14 only needs to specify the current area on the basis of the number (BSSID) of the wireless access point 13 in a connected state with the terminal device 14. Alternatively, calling of the neighborhood communication may be made on an one wireless access point in one area basis. In this case, too, the area tables 304 of the server 11 are not required any more.

Moreover, the position information of the terminal device 14 of the aforementioned embodiment is information based on the wireless access point 13 but this is not particularly limiting and it only needs to be configured capable of specifying the position information of the terminal device 14. For example, a GPS may be provided in the terminal device 14 so as to use a coordinate value specified from the GPS. Moreover, the area of the aforementioned embodiment is also set on the basis of the wireless access point 13 but this is not particularly limiting. If the position information of the terminal device 14 is specified as above from the coordinate value such as the GPS, for example, the setting of the area does not have to be made on the basis of the wireless access point 13.

Moreover, in the aforementioned embodiment, the terminal device 14 can perform the neighborhood communication which can specify only the area (neighborhood area) in which the device itself is located, but it may be so configured that the user can specify a desired area as in the management device 12. Furthermore, a plurality of the areas may be able to be specified in the area specified communication. For example, number (BSSID) of the wireless access point 13 belonging to the two areas may only be set to the AP number of the voice packet.

Moreover, in the aforementioned embodiment, the group number and the plenary number can be selected in the neighborhood communication and in the area specified communication, but the selection may be either one of them. Furthermore, in the aforementioned embodiment, the terminal device 14 is capable of the group communication and the like, but it may be only the neighborhood communication or the area specified communication.

In the aforementioned embodiment, a non-active terminal device is excluded as an excluded terminal device from the communication session, but it may be allowed to participate in the communication session in the middle at a point of time when this terminal device becomes active.

In the aforementioned embodiment, the communication session is established in correspondence with the calling voice packet transmitted from the terminal device 14, but a trigger of establishment of the communication session is not limited to that. For example, the administrator may establish or cancel the mixing group by operating the mixing tables 303 from the management device 12. Moreover, the management device 12 may establish or cancel the aforementioned expanded group communication between the groups. In this method, too, overall management and flexible changes of the mixing group can be realized.

REFERENCE NUMERALS

11 Server (Relaying device)
12 Management device
13 Wireless access point
14 Terminal device
20 Control unit (of the terminal device)
30 Control unit (of the server)

32 Network communication unit
60 Control unit (of the wireless access point)
101, 102 Section voice communication system
220 PTT (push-to-talk) switch
301 Terminal table
302 (302A, 302B) Group table
303 (303A, 303B) Mixing table
304 (304A, 304B) Area table

What is claimed is:

1. A relaying device comprising a network communication unit, a storage unit, and a control unit for wireless communication between a plurality of terminal devices, the wireless communication being established through a plurality of access points and a communication network, each of these access points having its coverage area within which the terminal devices belonging to one of the coverage areas are able to wirelessly receive a voice signal from and to transmit the voice signal to the one of the access points, one of the access points to which one of the terminal devices belongs being defined as a connected access point with respect to the belonging terminal device, wherein at least two section systems are created such that each of the terminal devices is assigned to one of the section systems, the assigned one of the section systems being defined as an assigned section system, the network communication unit is connected to the communication network, through which the voice signal is communicated, the storage unit stores a terminal table in which terminal identification codes for identifying the terminal devices, position information for identifying the connected access points, and section system numbers for identifying the assigned section systems are associated each other, and when receiving the voice signal and subsidiary information from one terminal device, which is defined as a source terminal device, the subsidiary information including at least a source terminal identification code for identifying the source terminal device and destination position information that identifies one or more connected access points to which the voice signal is to be transmitted, the control unit determines, by referring to the terminal table one section system number of the assigned section system to which the source terminal device is assigned based on the source terminal identification code and one or more connected access points based on the destination position information, the connected access points determined by the control unit being defined as destination access points, and transmits the voice signal together with the one section system number to the destination access points through the communication network, the voice signal being transmitted to all of the terminal devices that are assigned to the same section system as the source terminal device and belong to the destination access points.

2. The relaying device according to claim 1, wherein
the position information is either information that identifies a single connected access point or an area number that identifies two or more of connected access points,
the storage unit further includes an area table in which the access points and the area numbers are associated each other, the control unit determines the destination access points based on the destination position information referring to the area table.

3. A voice communication system that performs a wireless communication between a relaying device and terminal devices through a communication network via access points, comprising:

the relaying device that comprises a network communication unit, a storage unit, and a control unit for wireless communication between the terminal devices, the access points that have their coverage areas within which the terminal devices belonging to one of the coverage areas are able to wirelessly communicate a voice signal with the access points, one of the access points to which one of the terminal devices belongs being defined as a connected access point with respect to the belonging terminal device, the communication network that connects the relaying device to the access points, wherein at least two section systems are created such that each of the terminal devices is assigned to one of the section systems, the assigned one of the section systems being defined as an assigned section system, the network communication unit of the relaying device is connected to the communication network, through which the voice signal is communicated, the storage unit stores a terminal table in which terminal identification codes for identifying the terminal devices, position information for identifying the access points, and section system numbers for identifying the assigned section systems are associated each other, and when receiving the voice signal and subsidiary information from one terminal device, which is defined as a source terminal device, the subsidiary information including at least a source terminal identification code for identifying the source terminal device and destination position information that identifies one or more connected access points to which the voice signal is to be transmitted, the control unit determines, by referring to the terminal table one section system number of the assigned section system to which the source terminal device is assigned based on the source terminal identification code and one or more connected access points based on the destination position information, the connected access points being defined as destination access points, and transmits the voice signal together with the one section system number to the destination access points through the communication network, when receiving the voice signal together with the one section system number, the destination access points transmit the voice signal to all of the terminal devices that are assigned to the section system identified with the one section system number and belong to themselves.

4. A voice communication method executed by a relaying device comprising a network communication unit, a storage unit, and a control unit for wireless communication between a plurality of terminal devices, the wireless communication being established through a plurality of access points and a communication network, each of these access points having its coverage area within which the terminal devices belonging to one of the coverage areas are able to wirelessly receive a voice signal from and to transmit the voice signal to the one of the access points, one of the access points to which one of the terminal devices belongs being defined as a connected access point with respect to the belonging terminal device, wherein at least two section systems are created such that each of the terminal devices is assigned to one of the section systems, the assigned one of the section systems being defined as an assigned section system, and the storage unit stores a terminal table in which terminal identification codes for identifying the terminal devices, position information for identifying the connected access points, and section system numbers for identifying the assigned section systems are associated each other, the voice communication method, comprising:
determining followings i) and ii), by referring to the terminal table when receiving the voice signal and subsidiary information from one terminal device, which is defined as a source terminal device, the subsidiary information including at least a source terminal identification code for identifying the source terminal device and destination position information that identifies one or more connected access points to which the voice signal is to be transmitted,
   i) one section system number of the assigned section system to which the source terminal device is assigned based on the source terminal identification code and
   ii) one or more connected access points based on the destination position information, the connected access points being defined as destination access points, and transmitting the voice signal together with the one section system number to the destination access points through the communication network, the voice signal being transmitted to all of the terminal devices that are assigned to the same section system as the source terminal device and belong to the destination access points.

* * * * *